(12) United States Patent
Escott et al.

(10) Patent No.: US 9,002,357 B2
(45) Date of Patent: Apr. 7, 2015

(54) SYSTEMS, APPARATUS AND METHODS TO FACILITATE HANDOVER SECURITY

(75) Inventors: Adrian Edward Escott, Reading (GB); Anand Palanigounder, San Diego, CA (US); Osok Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 12/822,700

(22) Filed: Jun. 24, 2010

(65) Prior Publication Data

US 2011/0159841 A1 Jun. 30, 2011

Related U.S. Application Data

(60) Provisional application No. 61/220,823, filed on Jun. 26, 2009.

(51) Int. Cl.
*H04W 4/00* (2009.01)
*H04M 1/68* (2006.01)
(Continued)

(52) U.S. Cl.
CPC .......... *H04W 12/04* (2013.01); *H04W 36/0038* (2013.01); *H04L 9/0872* (2013.01);
(Continued)

(58) Field of Classification Search
CPC ..... H04W 12/00; H04W 12/02; H04W 12/04; H04W 12/06; H04W 12/08; H04W 12/10; H04W 12/12; H04W 36/14; H04W 36/16; H04W 48/00; H04W 48/08; H04W 48/17; H04W 48/20; H04L 9/0869; H04L 9/0481; H04L 9/3271; H04L 2463/00; H04L 2463/041; H04L 2463/061; H04L 2463/081; H04L 9/0816; H04L 9/006; H04L 9/08; H04L 9/0861; H04L 63/064; H04L 63/0869

USPC .......... 380/270, 272, 273, 282, 44, 47, 45, 30
See application file for complete search history.

(56) References Cited

U.S. PATENT DOCUMENTS

| 8,346,261 B2 * | 1/2013 | Iwamura et al. ............... 455/436 |
| 2004/0103282 A1 * | 5/2004 | Meier et al. .................... 713/171 |
| 2008/0188200 A1 * | 8/2008 | Forsberg ........................ 455/410 |

FOREIGN PATENT DOCUMENTS

WO    WO2008038949    4/2008

OTHER PUBLICATIONS

3GPP TS 24.301 V8.1.0 (Mar. 2009) 3rd Generation Partnership Project; Technical Specification Group Core Network and Terminals; Non-Access-Stratum (NAS) protocol for Evolved Packet System (EPS); Stage 3 (Release 8).*

(Continued)

*Primary Examiner* — Ariel Balaoing
*Assistant Examiner* — Nalini Mummalaneni
(74) *Attorney, Agent, or Firm* — Michael J. DeHaemer, Jr.

(57) ABSTRACT

Systems, methods and apparatus for facilitating handover security are provided. In some embodiments, the method can include deriving a key value for handover from a GERAN/UTRAN system to an E-UTRAN system using a first input value. The method can also include deriving a key value for a connection establishment using a second input value, wherein the first input value is different from the second input value and is different from input values derived subsequent to the second input value, and wherein the first input value, the second input value and the input values derived subsequent to the second input value are configured to be input to a same key derivation function configured to output a key for use between a network entity and user equipment.

40 Claims, 14 Drawing Sheets

(51) Int. Cl.
*H04W 12/04* (2009.01)
*H04W 36/00* (2009.01)
*H04L 9/08* (2006.01)
*H04W 36/14* (2009.01)
*H04W 84/04* (2009.01)

(52) U.S. Cl.
CPC .......... *H04L2463/061* (2013.01); *H04W 36/14* (2013.01); *H04W 84/045* (2013.01); *H04L 2209/80* (2013.01)

(56) References Cited

OTHER PUBLICATIONS

Security measures and analysis for intra-eNB handover signalling in LTE_ACTIVE 3GPP TSG-SA WG3 Security—S3#43 (S3-060249); Apr. 4-7, 2006; Athens, Greece.*

"3GPP System Architecture Evolution (SAE): Security Architecture; 3GPP TS 33.401 (Release 8)" 3rd Generation Partnership Project (3GPP) Standard, Dec. 19, 2008, XP050376844 cited in the application section 9.2.2 sections A.3, A.5.

International Search Report and Written Opinion—PCT/US2010/040254—International Search Authority, European Patent Office,Nov. 5, 2010.

"Rationale and track of security decisions in Long Term Evolved (LTE) RAN / 3GPP System Architecture Evolution (SAE); 3GPP TS 33.401 (Release 9)" 3rd Generation Partnership Project (3GPP) Standard, Jun. 12, 2009, XP050376896 section 5.1.2.2.

Taiwan Search Report—TW099120870—TIPO—Apr. 18, 2013.

(3GPP TS 33.401 version 8.4.0 Release 8) Digital cellular telecommunications system (Phase 2+); Universal Mobile Telecommunications System (UMTS); LTE; 3GPP System Architecture Evolution (SAE); Security architecture, ETSI TS 133 401 V8.4.0 (Jul. 2009), p. 1-96.

* cited by examiner

US 9,002,357 B2

SYSTEMS, APPARATUS AND METHODS TO FACILITATE HANDOVER SECURITY

CROSS-REFERENCE TO RELATED APPLICATIONS

This application claims the benefit of U.S. Provisional Patent Application Ser. No. 61/220,823 titled "METHOD AND APPARATUS FOR IMPROVING HANDOVER SECURITY IN LTE/E-UTRAN," which was filed Jun. 26, 2009, and the entire contents of which are incorporated herein by reference.

BACKGROUND

I. Field

The following description relates to wireless communications, in general, and to facilitating handover security in wireless communication systems, in particular.

II. Background

Wireless communication systems are widely deployed to provide various types of communication. For instance, voice and/or data can be provided via such wireless communication systems. A typical wireless communication system, or network, can provide multiple users access to one or more shared resources (e.g., bandwidth, transmit power). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple access communication systems can simultaneously support communication for multiple user equipment (UEs). Each UE can communicate with one or more base stations (BSs) via transmissions on forward and reverse links. The forward link (or downlink (DL)) refers to the communication link from BSs to UEs, and the reverse link (or uplink (UL)) refers to the communication link from UEs to BSs.

In various embodiments, the BS can be placed in untrusted locations posing risk of security breaches during communication with the UE for handover and other processes. Existing handover techniques have at least one security vulnerability: the repetition of the same keystream used during different processes (e.g., handover and other processes). For example, with regard to existing Long-Term Evolution (LTE)/Evolved Universal Terrestrial Radio Access Network (UTRAN) (collectively, E-UTRAN) security architecture (as defined in 3GPP TS 33.401 v8.4.0, "3rd Generation Partnership Project; Technical Specification Group Services and System Aspects; 3GPP System Architecture Evolution (SAE); Security architecture (Release 8)"), the possibility of keystream repeat for access stratum (AS) security during Inter-Radio Access Technology (IRAT) Handover scenarios is a security vulnerability.

One such example is handover from a Global System for Mobile Communications (GSM) Enhanced Data rates for GSM Evolution (EDGE) Radio Access Network (collectively, GERAN)/UTRAN to a E-UTRAN. Specifically, when the UE is on an active mode in GERAN/UTRAN, AS security is provided using keys derived from one or more security contexts previously-established between the UE and the network. The UE performs handover to new cell in active mode and key, $K_{eNB}$, derived with a Key Derivation Function (KDF) from a mapped security context. The KDF uses a value indicative of a number of instances of computing the key $K_{eNB}$, and/or non-access stratum (NAS) COUNT information as inputs to avoid keystream repeat for a given security context. The computation of $K_{eNB}$ is performed according to the following equation: $K_{eNB}=KDF (K_{ASME}, S)$, where S is an input string to the KDF along with key $K_{ASME}$. S can include FC (with an FC value of 0x11)|UL NAS COUNT (with a value of 0x00 0x00)|length of the UL NAS COUNT (with a value of 0x00 0x04). FC can be an octet used to distinguish between different instances of the same algorithm. The instances can be indicative of the different types of algorithms performed. For example, different FC values are used depending on the parameter being derived. The current FC values can be in the range 0x10-0x1F. $K_{ASME}$ is a 256-bit key derived by the UE and by the Access Security Management Entity (ASME) called Mobility Management Entity (MME). The UE goes to idle mode in the new cell, for example, after a call has ended. The KDF function is also applied when a cryptographically protected E-UTRAN radio bearer is established and when a key change on-the-fly is performed.

After the passage of time, the UE performs a NAS Service Request to the same cell using idle to active mode procedures. As such, the $K_{eNB}$ is again derived using the same formula as the formula used to derive $K_{eNB}$ for handover, e.g., $K_{eNB}=KDF (K_{ASME}, S)$, where S is FC (with an FC value of 0x11)|UL NAS COUNT (with a value of 0x00 0x00)|length of the UL NAS COUNT (with a value of 0x00 0x04). Because the UE has not sent any NAS messages before the NAS service request, the UL NAS COUNT is still zero. As a result, the same $K_{eNB}$ value is computed. Computation of the same $K_{eNB}$ value results in a keystream repeat in AS level security. A keystream repeat can result in a serious security breach. As such, systems, methods and apparatus for improving handover security are desirable.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating handover security.

In some aspects, a method is provided. The method can include: deriving a key value for handover from a GERAN/UTRAN system to an E-UTRAN system using a first input value; and deriving a key value for a connection establishment using a second input value, wherein the first input value is different from the second input value and is different from input values derived subsequent to the second input value, and wherein the first input value, the second input value and the input values derived subsequent to the second input value are configured to be input to a same key derivation function configured to output a key for use between a network entity and user equipment.

In some aspects, a computer program product having a computer-readable medium is provided. The computer program product can include a first set of codes for causing a computer to derive a key value for handover from a GERAN/UTRAN system to an E-UTRAN system using a first input value. The computer program product can include a second set of codes for causing the computer to derive a key value for a connection establishment using a second input value, wherein the first input value is different from the second input value and is different from input values derived subsequent to the second input value, and wherein the first input value, the second input value and the input values derived subsequent to the second input value are configured to be input to a same key derivation function configured to output a key for use between a network entity and user equipment.

In some aspects, an apparatus is provided. The apparatus can include: means for deriving a key value for handover from a GERAN/UTRAN system to an E-UTRAN system using a first input value; and deriving a key value for a connection establishment using a second input value, wherein the first input value is different from the second input value and is different from input values derived subsequent to the second input value, and wherein the first input value, the second input value and the input values derived subsequent to the second input value are configured to be input to a same key derivation function configured to output a key for use between a network entity and user equipment.

In some aspects, another apparatus is provided. The apparatus can include: a mobility management module configured to: derive a key value for handover from a GERAN/UTRAN system to an E-UTRAN system using a first input value; and derive a key value for a connection establishment using a second input value, wherein the first input value is different from the second input value and is different from input values derived subsequent to the second input value, and wherein the first input value, the second input value and the input values derived subsequent to the second input value are configured to be input to a same key derivation function configured to output a key for use between a network entity and UE.

In other aspects, another method is provided. The method can include: deriving a key value for handover from a GERAN/UTRAN system to an E-UTRAN system using a first input value; and deriving a key value for a connection establishment using a second input value, wherein the first input value is different from the second input value, and wherein the first input value and the second input value are values indicative of instances of deriving a key for use between a network entity and user equipment.

In some aspects, another computer program product having a computer-readable medium is provided. The computer program product can include a first set of codes for causing a computer to derive a key value for handover from a GERAN/UTRAN system to an E-UTRAN system using a first input value. The computer program product can also include a second set of codes for causing the computer to derive a key value for a connection establishment using a second input value, wherein the first input value is different from the second input value, and wherein the first input value and the second input value are values indicative of instances of deriving a key for use between a network entity and user equipment.

In some aspects, an apparatus is provided. The apparatus can include: means for deriving a key value for handover from a GERAN/UTRAN system to an E-UTRAN system using a first input value. The apparatus can also include a means for deriving a key value for a connection establishment using a second input value, wherein the first input value is different from the second input value, and wherein the first input value and the second input value are values indicative of instances of deriving a key for use between a network entity and user equipment.

In some aspects, another apparatus is provided. The apparatus can include: a mobility management module configured to: derive a key value for handover from a GERAN/UTRAN system to an E-UTRAN system using a first input value; and derive a key value for a connection establishment using a second input value, wherein the first input value is different from the second input value, and wherein the first input value and the second input value are values indicative of instances of deriving a key for use between a network entity and user equipment.

Toward the accomplishment of the foregoing and related ends, the one or more embodiments comprise the features hereinafter fully described and particularly pointed out in the claims. The following description and the annexed drawings set forth herein detail certain illustrative aspects of the one or more embodiments. These aspects are indicative, however, of but a few of the various ways in which the principles of various embodiments can be employed and the described embodiments are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Figure 1:
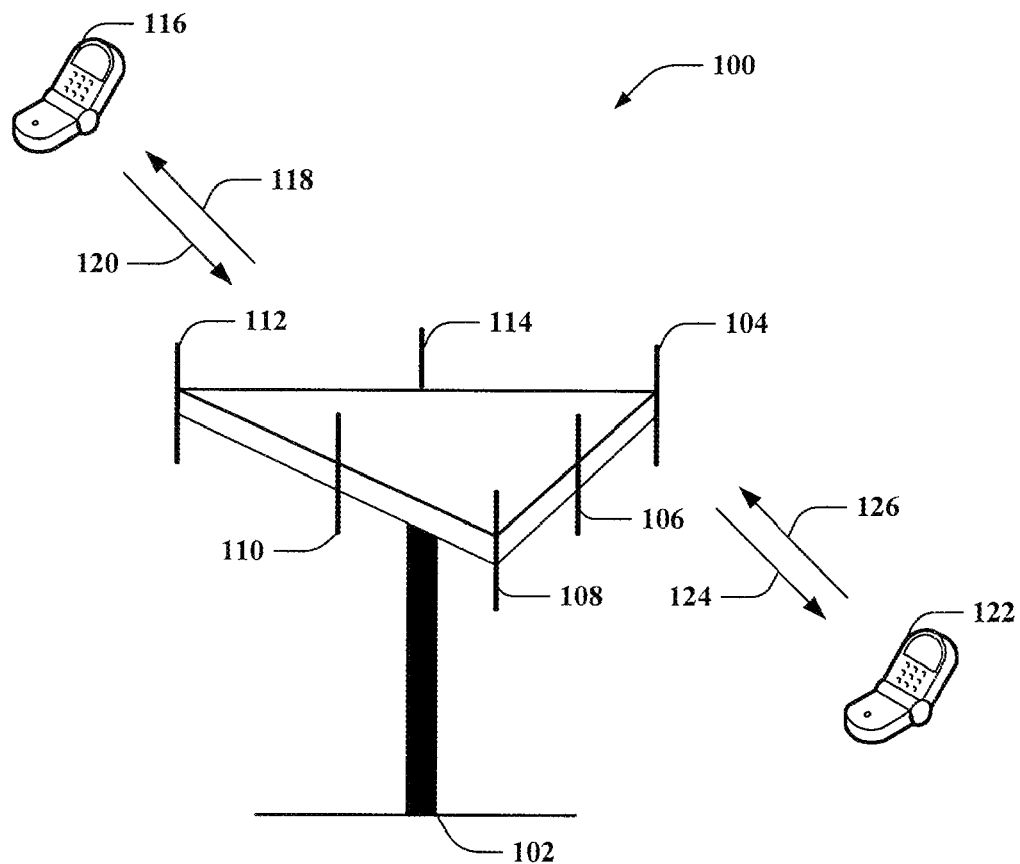
FIG. 1 is an illustration of an example wireless communication system for facilitating handover security in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiments may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software and/or software in execution. For example, a component can be, but is not limited to being, a process running on a processor, a processor, an object, an executable, a thread of execution, a program, and/or a computer. By way of illustration, both an application running on a computing device and/or the computing device can be a component. One or more components can reside within a process and/or thread of execution and a component can be localized on one computer and/or distributed between two or more computers. In addition, these components can execute from various computer-readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and/or other systems. The terms "system" and "network" are often used interchangeably. A CDMA system can implement a radio technology such as Universal Terrestrial Radio Access (UTRA), CDMA8020, etc. UTRA includes Wideband-CDMA (W-CDMA) and other variants of CDMA. CDMA8020 covers IS-8020, IS-95 and IS-856 standards. An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA8020 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA) utilizes single carrier modulation and frequency domain equalization. SC-FDMA can have similar performance and essentially the same overall complexity as those of an OFDMA system. A SC-FDMA signal can have lower peak-to-average power ratio (PAPR) because of its inherent single carrier structure. SC-FDMA can be used, for instance, in uplink communications where lower PAPR greatly benefits UEs in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with UEs. A UE can also be called a system, subscriber unit, subscriber station, mobile station, mobile, remote station, remote terminal, mobile device, access terminal, wireless communication device, user agent or user device. A UE can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a BS or access node (AN). A BS can be utilized for communicating with UEs and can also be referred to as an access point, BS, Femto node, Pico Node, Node B, Evolved Node B (eNodeB, eNB) or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include, but are not limited to, magnetic storage devices (e.g., hard disk, floppy disk, magnetic strips), optical disks (e.g., compact disk (CD), digital versatile disk (DVD)), smart cards, and flash memory devices (e.g., EPROM, card, stick, key drive). Additionally, various storage media described herein can represent one or more devices and/or other machine-readable media for storing information. The term "machine-readable medium" can include, without being limited to, wireless channels and various other media (and/or storage media) capable of storing, containing, and/or carrying codes and/or instruction(s) and/or data.

In some aspects the teachings herein may be employed in a network that includes macro scale coverage (e.g., a large area cellular network such as a 3G networks, typically referred to as a macro cell network) and smaller scale coverage (e.g., a residence-based or building-based network environment). A UE moves through such a network. The UE may be served in certain locations by BSs that provide macro coverage while the UE may be served at other locations by BSs that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a Macro node. A node that provides coverage over a relatively small area (e.g., a residence) may be referred to as a Femto node. A node that provides coverage over an area that is smaller than a macro area and larger than a Femto area may be referred to as a Pico node (e.g., providing coverage within a commercial building).

A cell associated with a Macro node, a Femto node, or a Pico node may be referred to as a macro cell, a Femto cell, or a Pico cell, respectively. In some implementations, each cell may be further associated with (e.g., divided into) one or more sectors.

In various applications, other terminology may be used to reference a Macro node, a Femto node, or a Pico node. For example, a Macro node may be configured or referred to as a BS, access point, eNodeB, macro cell, and so on. Also, a Femto node may be configured or referred to as a Home NodeB, Home eNodeB, access point access node, a BS, a Femto cell, and so on.

FIG. 1 is an illustration of an example wireless communication system for facilitating handover security in accordance with various aspects set forth herein. In wireless communication system 100, interference caused by transmissions on the UL can be managed by the BS 102 while interference caused by transmissions on the DL can be managed by the UEs 116, 122.

Referring now to FIG. 1, a wireless communication system 100 is illustrated in accordance with various embodiments presented herein. System 100 includes a BS 102 that can include multiple antenna groups. For example, one antenna group can include antennas 104, 106, another group can comprise antennas 108, 110, and an additional group can include antennas 112, 114. Two antennas are illustrated for each antenna group; however, more or fewer antennas can be utilized for each group. BS 102 can additionally include a transmitting node chain and a receiving node chain, each of which can in turn comprise a plurality of components associated with signal transmission and reception (e.g., processors, modulators, multiplexers, demodulators, demultiplexers, antennas), as will be appreciated by one skilled in the art.

BS 102 can communicate with one or more UEs such as UE 116, 122. However, it is to be appreciated that BS 102 can communicate with substantially any number of UEs similar to UEs 116, 122. UEs 116, 122 can be, for example, cellular phones, smart phones, laptops, handheld communication devices, handheld computing devices, satellite radios, global positioning systems, PDAs, and/or any other suitable device for communicating over wireless communication system 100. As depicted, UE 116 is in communication with antennas 112, 114, where antennas 112, 114 transmit information to UE 116 over DL 118 and receive information from UE 116 over a UL 120. Moreover, UE 122 is in communication with antennas 104, 106, where antennas 104, 106 transmit information to UE 122 over a DL 124 and receive information from UE 122 over a UL 126. In a frequency division duplex (FDD) system, DL 118 can utilize a different frequency band than that used by UL 120, and DL 124 can employ a different frequency band than that employed by UL 126, for example. Further, in a time division duplex (TDD) system, DL 118 and UL 120 can utilize a common frequency band and DL 124 and UL 126 can utilize a common frequency band.

Each group of antennas and/or the area in which they are designated to communicate can be referred to as a sector of BS 102. For example, antenna groups can be designed to communicate to UEs in a sector of the areas covered by BS 102. In communication over DLs 118, 124, the transmitting antennas of BS 102 can utilize beamforming to improve signal-to-noise ratio of DLs 118, 124 for UEs 116, 122. Also, while BS 102 utilizes beamforming to transmit to UEs 116, 122 scattered randomly through an associated coverage, UEs 116, 122 in neighboring cells can be subject to less interference as compared to a BS transmitting through a single antenna to all its UEs. Further, the BS 102 and UEs 116, 122 can be configured for facilitating handover security as described herein.

Figure 2:
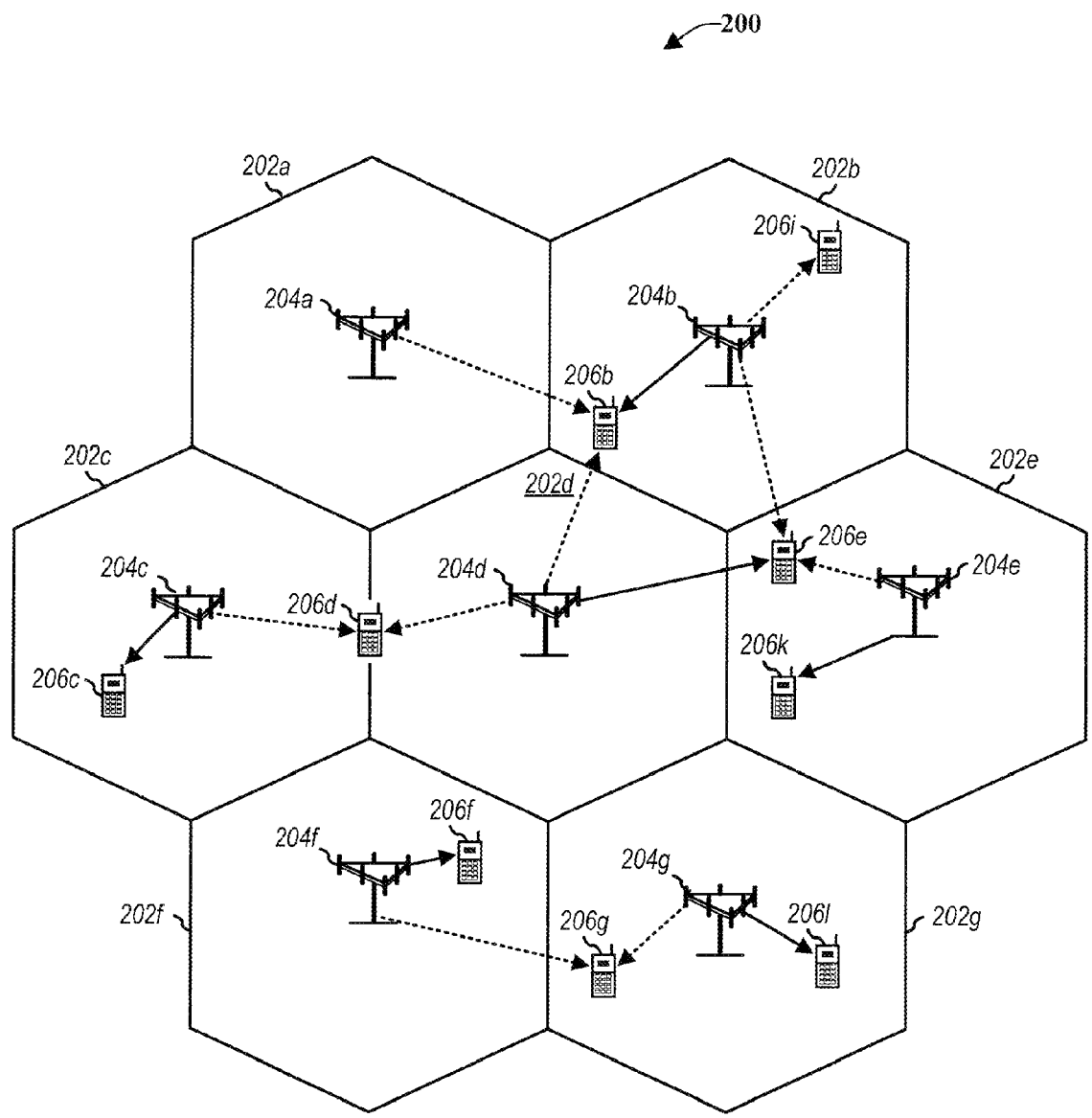
FIG. 2 is an illustration of another example wireless communication system for facilitating handover security in accordance with various aspects set forth herein.

FIG. 2 is an illustration of another example wireless communication system for facilitating handover security for a number of users in accordance with various aspects set forth herein. The system 200 provides communication for multiple cells 202, such as, for example, macro cells 202A-202G, with each cell being serviced by a corresponding BS 204 (e.g., BS 204A-204G). As shown in FIG. 2, UE 206 (e.g., UEs 206A-206L) can be dispersed at various locations throughout the system over time. Each UE 206 can communicate with one or more BS 204 on a DL or a UL at a given moment, depending upon whether the UE 206 is active and whether it is in soft handoff, for example. The UE 206 can participate in handover to communicate with a new BS in a new cell. In embodiments, handover security can be facilitated in the system 300 as described herein. The wireless communication system 200 may provide service over a large geographic region. For example, macro cells 202A-202G may cover a few blocks in a neighborhood.

Figure 3:
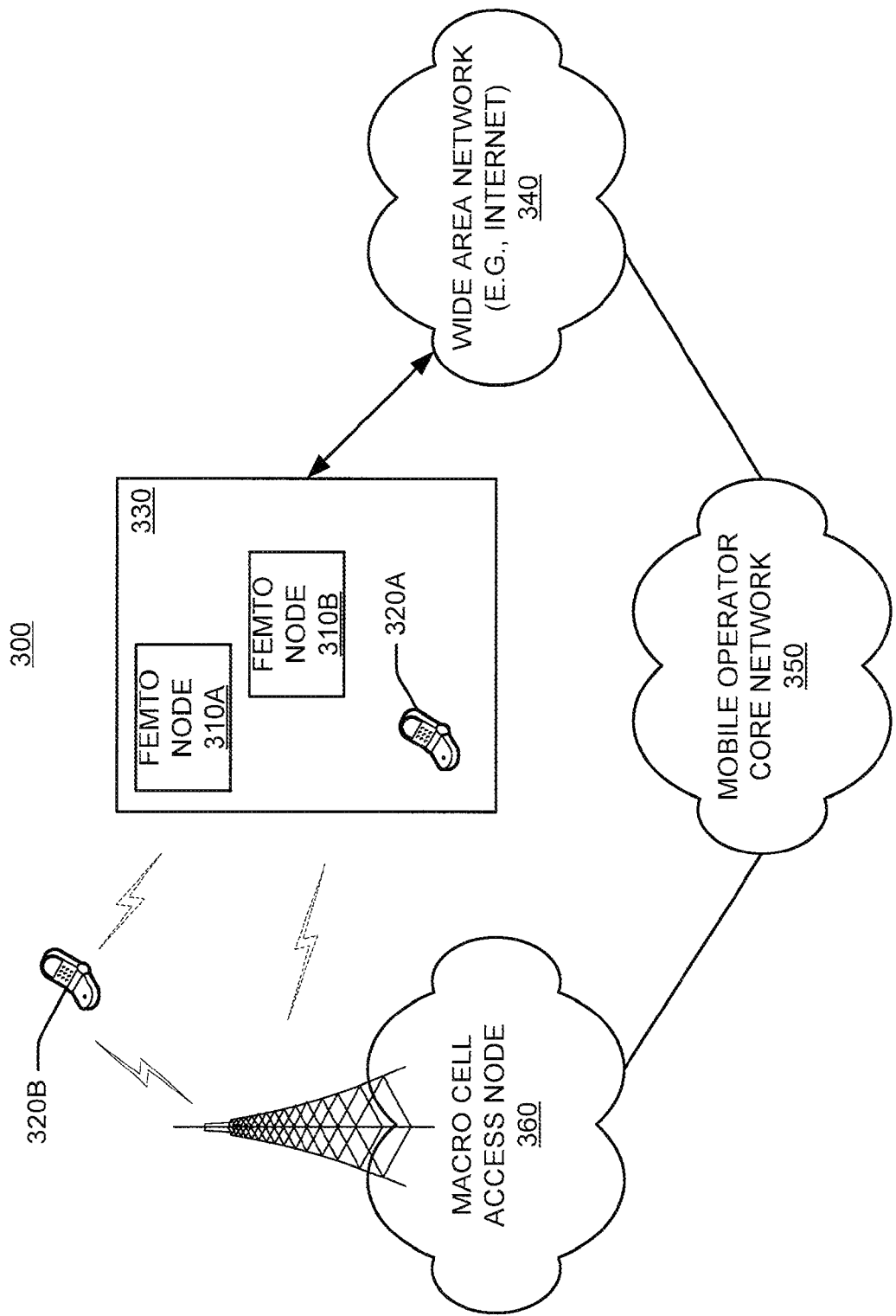
FIG. 3 is an illustration of an example wireless communication system where one or more Femto nodes are deployed for facilitating handover security in accordance with various aspects set forth herein.

FIG. 3 is an illustration of an example wireless communication system where one or more Femto nodes are deployed for facilitating handover security in accordance with various aspects set forth herein. Specifically, the system 300 includes multiple Femto nodes 310 (e.g., Femto nodes 310A and 310B) installed in a relatively small scale network environment (e.g., in one or more user residences 330). Each Femto node 310 can be coupled to a wide area network 340 (e.g., the Internet) and a mobile operator core network 350 via a DSL router, a cable modem, a wireless link, or other connectivity means (not shown). As will be discussed below, each Femto node 310 can be configured to serve associated UEs (e.g., associated UE 320A) and, optionally, alien UEs (e.g., alien UE 320B). In other words, access to Femto nodes 310 may be restricted whereby a given UE 320 can be served by a set of designated (e.g., home) Femto node(s) 310 but may not be served by any non-designated Femto nodes 310 (e.g., a neighbor's Femto node 310).

However, in various embodiments, an associated UE 320A can experience interference on the DL from a Femto node 310 serving an alien UE 320B. Similarly, a Femto node 310 associated with associated UE 320A can experience interference on the UL from the alien UE 320B.

Figure 4:
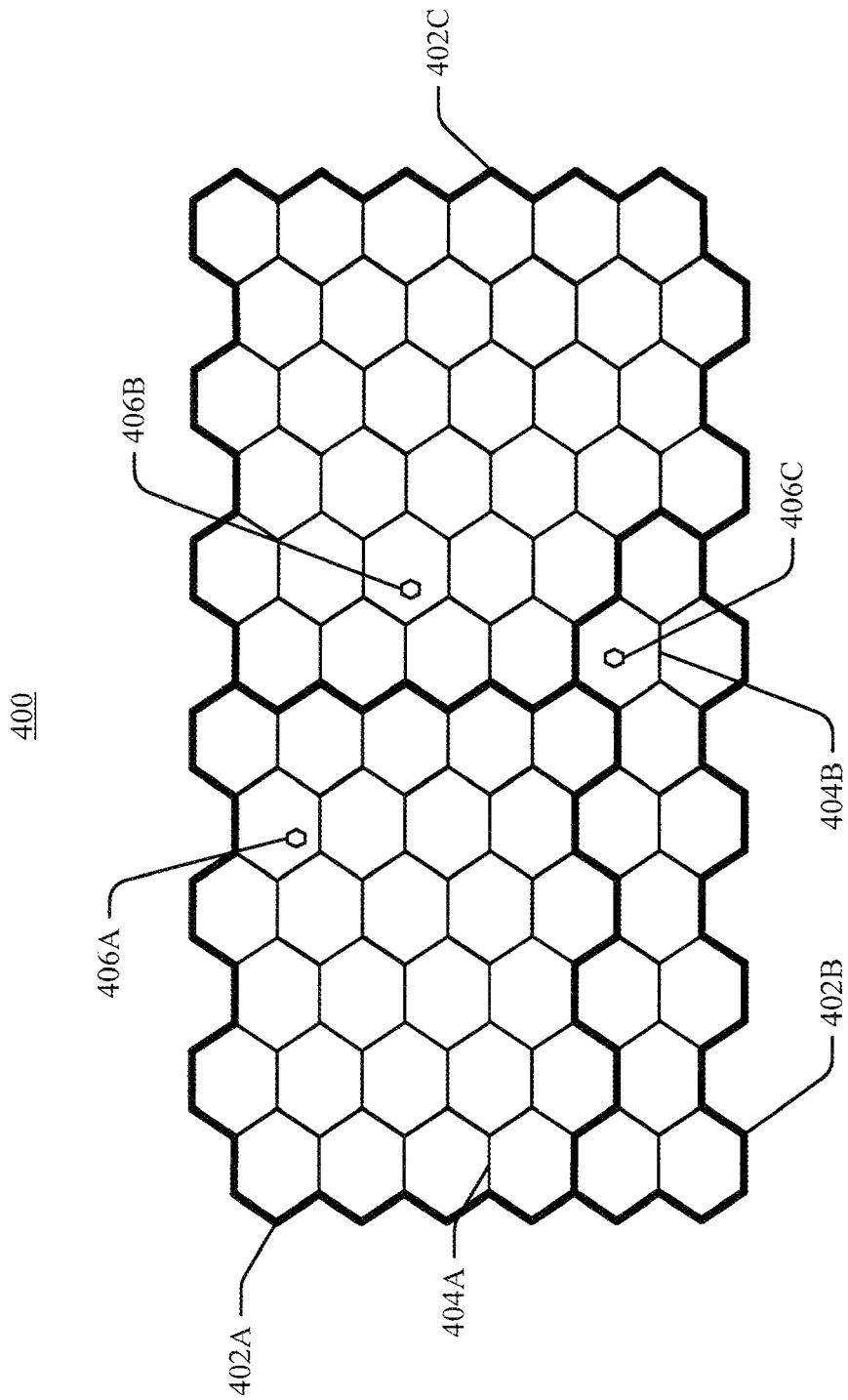
FIG. 4 is an illustration of an example coverage map in a wireless communication system for facilitating handover security in accordance with various aspects set forth herein.

FIG. 4 is an illustration of an example coverage map in a wireless communication system for facilitating handover security in accordance with various aspects set forth herein. The coverage map 400 can include several tracking areas 402 (or routing areas or location areas), each of which can include several macro coverage areas. In the embodiment shown, areas of coverage associated with tracking areas 402A, 402B, and 402C are delineated by the wide lines and the macro coverage areas 404 are represented by the hexagons. The tracking areas 402A, 402B, and 402C can include Femto coverage areas 406. In this example, each of the Femto coverage areas 406 (e.g., Femto coverage area 406C) is depicted within a macro coverage area 404 (e.g., macro coverage area 404B). It should be appreciated, however, that a Femto coverage area 406 may not lie entirely within a macro coverage area 404. In practice, a large number of Femto coverage areas 406 can be defined with a given tracking area 402 or macro coverage area 404. Also, one or more Pico coverage areas (not shown) can be defined within a given tracking area 402 or macro coverage area 404.

Referring again to FIG. 3, the owner of a Femto node 310 can subscribe to mobile service, such as, for example, 3G mobile service, offered through the mobile operator core network 350. In addition, a UE 320 may be capable of operating both in macro environments and in smaller scale (e.g., residential) network environments. In other words, depending on the current location of the UE 320, the UE 320 may be served by an access node 360 of the macro cell mobile network 350 or by any one of a set of Femto nodes 310 (e.g., the Femto nodes 310A and 310B that reside within a corresponding user residence 330). For example, when a subscriber is outside his home, he is served by a standard macro access node (e.g., node 360) and when the subscriber is at home, he is served by a Femto node (e.g., node 310A). Here, it should be appreciated that a Femto node 310 may be backward compatible with existing UEs 320.

A Femto node 310 may be deployed on a single frequency or, in the alternative, on multiple frequencies. Depending on the particular configuration, the single frequency or one or more of the multiple frequencies can overlap with one or more frequencies used by a Macro node (e.g., node 360).

In some aspects, a UE 320 can be configured to connect to a preferred Femto node (e.g., the home Femto node of the UE 320) whenever such connectivity is possible. For example, whenever the UE 320 is within the user's residence 330, it may be desired that the UE 320 communicate only with the home Femto node 310.

In some aspects, if the UE 320 operates within the macro cellular network 350 but is not residing on its most preferred network (e.g., as defined in a preferred roaming list), the UE 320 may continue to search for the most preferred network (e.g., the preferred Femto node 310) using a Better System Reselection (BSR), which can involve a periodic scanning of available systems to determine whether better systems are currently available, and subsequent efforts to associate with such preferred systems. With the acquisition entry, the UE 320 may limit the search for specific band and channel. For example, the search for the most preferred system may be repeated periodically. Upon discovery of a preferred Femto node 310, the UE 320 selects the Femto node 310 for camping within its coverage area.

A Femto node may be restricted in some aspects. For example, a given Femto node may only provide certain services to certain UEs. In deployments with so-called restricted (or closed) association, a given UE may only be served by the macro cell mobile network and a defined set of Femto nodes (e.g., the Femto nodes 310 that reside within the corresponding user residence 330). In some implementations, a node may be restricted to not provide, for at least one node, at least one of: signaling, data access, registration, paging, or service.

In some aspects, a restricted Femto node (which may also be referred to as a Closed Subscriber Group Home NodeB) is one that provides service to a restricted provisioned set of UEs. This set may be temporarily or permanently extended as necessary. In some aspects, a Closed Subscriber Group (CSG) may be defined as the set of BSs (e.g., Femto nodes) that share a common access control list of UEs. A channel on which all Femto nodes (or all restricted Femto nodes) in a region operate may be referred to as a Femto channel.

Various relationships may thus exist between a given Femto node and a given UE. For example, from the perspective of a UE, an open Femto node may refer to a Femto node with no restricted association. A restricted Femto node may refer to a Femto node that is restricted in some manner (e.g., restricted for association and/or registration). A home Femto node may refer to a Femto node on which the UE is authorized to access and operate on. A guest Femto node may refer to a Femto node on which a UE is temporarily authorized to access or operate on. An alien Femto node may refer to a Femto node on which the UE is not authorized to access or operate on, except for perhaps emergency situations (e.g., 911 calls).

From a restricted Femto node perspective, a home UE may refer to a UE that authorized to access the restricted Femto node. A guest UE may refer to a UE with temporary access to the restricted Femto node. An alien UE may refer to a UE that does not have permission to access the restricted Femto node, except for perhaps emergency situations, for example, such as 911 calls (e.g., a UE that does not have the credentials or permission to register with the restricted Femto node).

While the description of FIG. 4 has been provided with reference to a Femto node, it should be appreciated, that a Pico node may provide the same or similar functionality for a larger coverage area. For example, a Pico node may be restricted, a home Pico node may be defined for a given UE, and so on.

A wireless multiple-access communication system can simultaneously support communication for multiple wireless UEs. As mentioned above, each UE can communicate with one or more BSs via transmissions on the DL or the UL. These communication links (i.e., DL and UL) may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system can support TDD and FDD. In a TDD system, the DL and UL transmissions can be on the same frequency region so that the reciprocity principle allows the estimation of the DL channel from the UL. This enables the BS to transmit beam-forming gain on the DL when multiple antennas are available at the BS.

Figure 5A:
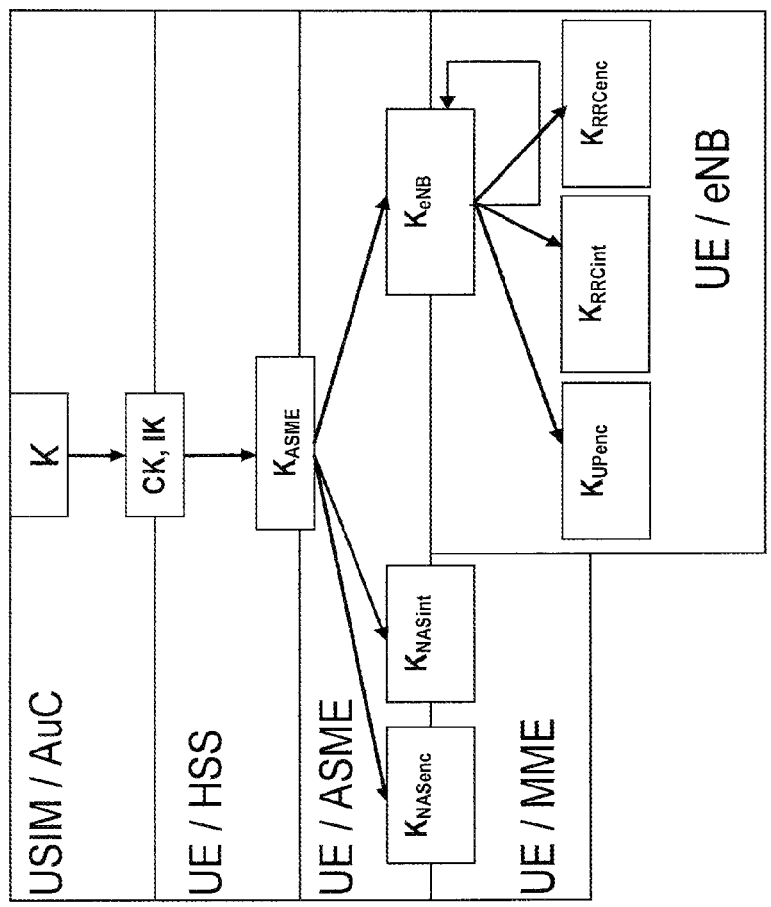
FIGS. 5A, 5B and 5C are illustrations of block diagrams of a key hierarchy in an E-UTRAN, a key derivation at the network and a key derivation at the UE in accordance with various aspects set forth herein.
Figure 5B:
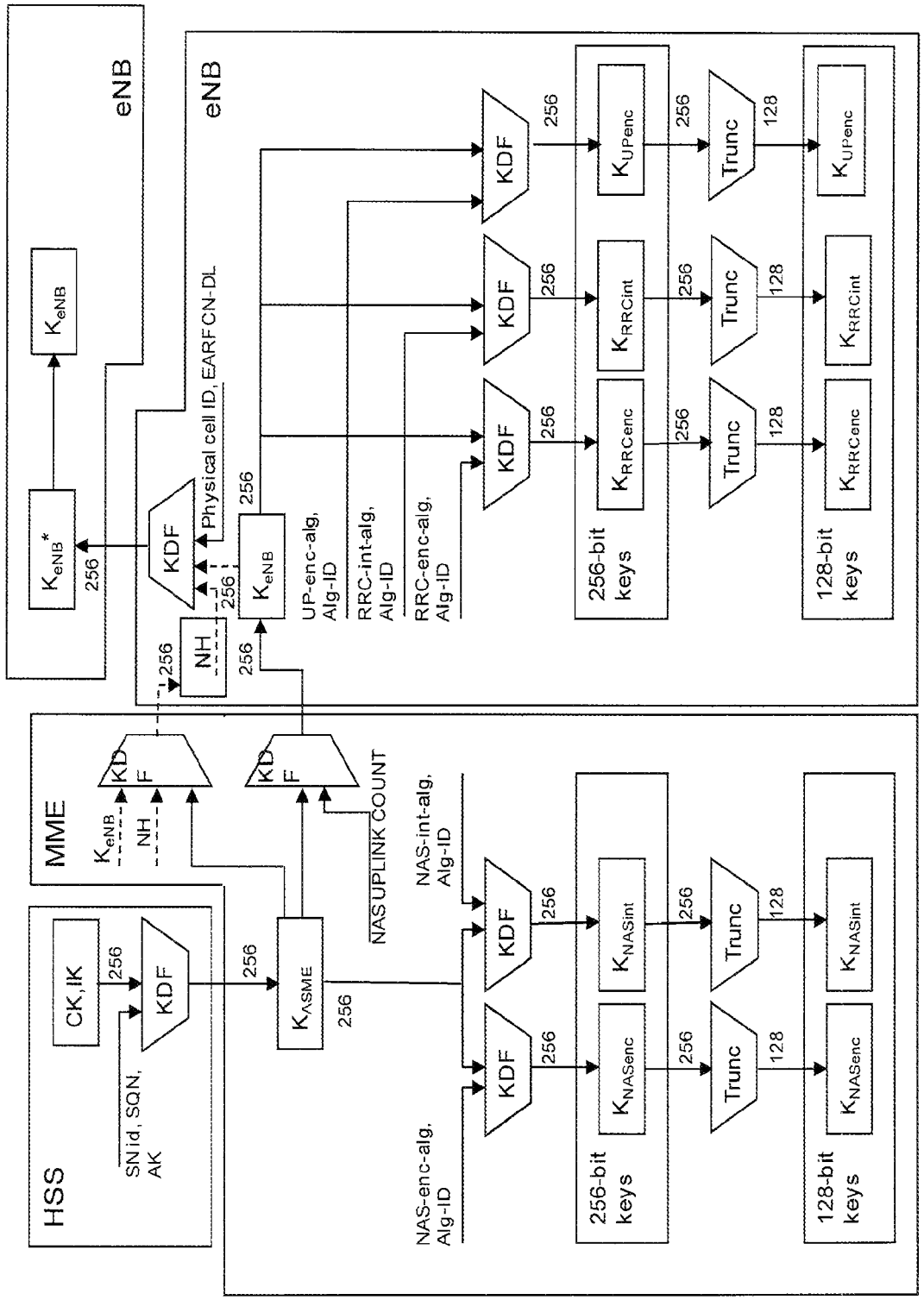
Figure 5C:
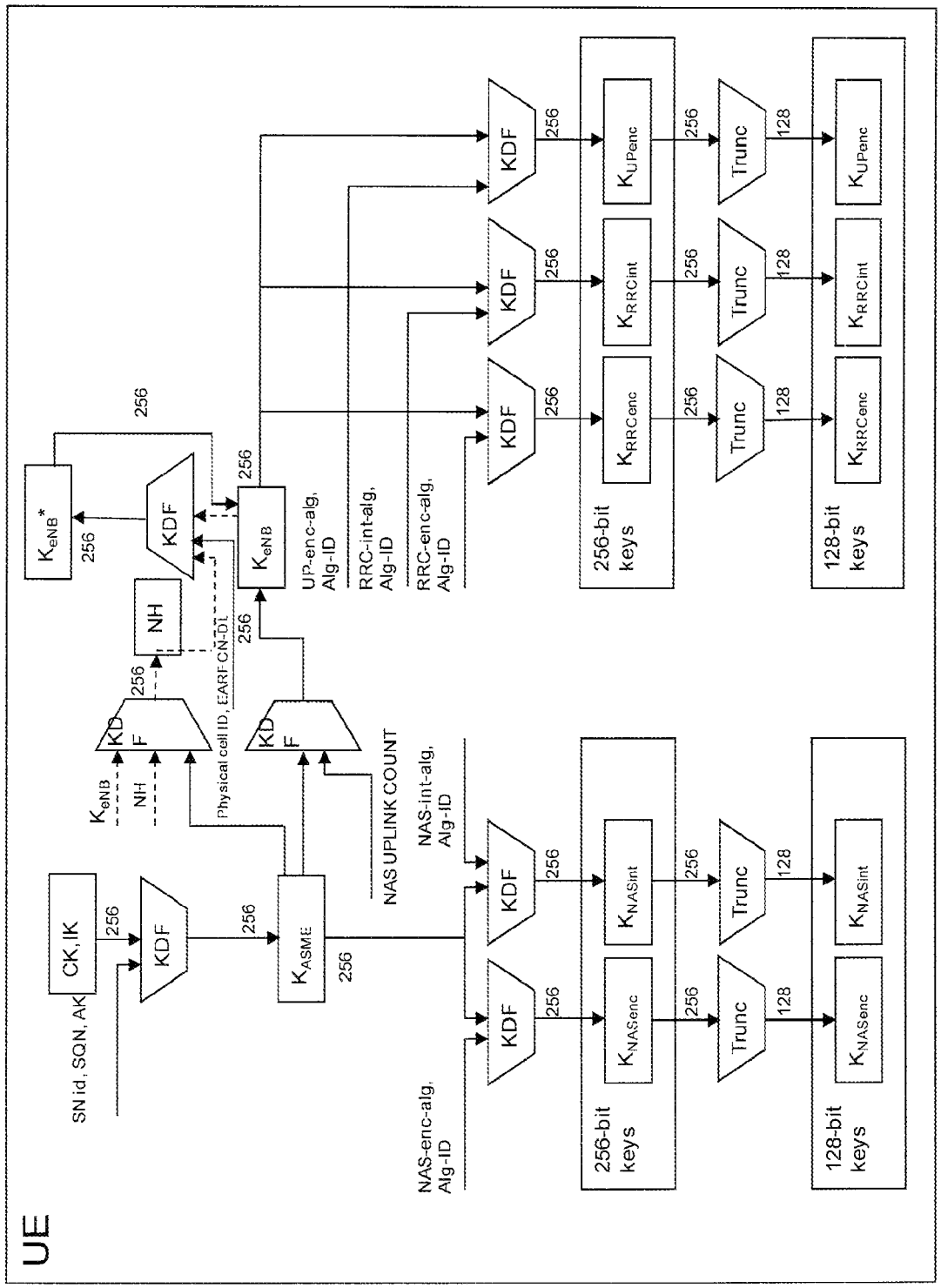

FIGS. 5A, 5B and 5C are illustrations of block diagrams of a key hierarchy in an E-UTRAN, a key derivation of the network and a key derivation at a UE, respectively, in accordance with various aspects set forth herein. As shown in FIGS. 5A, 5B and 5C, an UL NAS COUNT value is input to the KDF, and the KDF derives the key $K_{eNB}$ by using the UL NAS COUNT value. As described with reference to FIGS. 6 and 7, the value for the UL NAS COUNT that is used during handover of a UE from a UTRAN to an E-UTRAN system can be dictated to avoid, or increase the chances of avoiding, repetition of the same key $K_{eNB}$ being generated.

In some embodiments, as described in 3GPP TS 33.401 section 6.2, the key hierarchy and key derivations can be as shown in FIGS. 5A, 5B and 5C. For example, $K_{eNB}$ can be a key derived by the UE and a Mobility Management Entity (MME) 524 from $K_{ASME}$ or by the UE and a target eNB from KeNB* during eNB handover. In some embodiments, $K_{eNB}$ is used only for the derivation of keys for radio resource control (RRC) traffic and the derivation of keys for UP traffic or to derive a transition key $K_{eNB}$* during an eNB handover.

The keys for NAS traffic can include a key $K_{NASint}$, which, in some embodiments, is used only for the protection of NAS traffic with a particular integrity algorithm. This key can be derived by UE and MME from $K_{ASME}$, as well as an identifier for the integrity algorithm. The key for NAS traffic can also include a key $K_{NASenc}$, which in some embodiments, is used only for the protection of NAS traffic with a particular encryption algorithm. This key can be derived by UE and MME from $K_{ASME}$, as well as an identifier for the encryption algorithm.

The keys for UP traffic can include key $K_{UPenc}$, which, in some embodiments, can be used only for the protection of UP traffic with a particular encryption algorithm. This key can be derived by UE and eNB from $K_{eNB}$, as well as an identifier for the encryption algorithm.

The keys for RRC traffic can include key $K_{RRCint}$, which, in some embodiments, is a key used for the protection of RRC traffic with a particular integrity algorithm. This key can be derived by UE and eNB from $K_{eNB}$, as well as an identifier for the integrity algorithm. The key for RRC traffic can also include key $K_{RRCenc}$, which, in some embodiments, is a key used only for the protection of RRC traffic with a particular encryption algorithm. $K_{RRCenc}$ can be derived by UE and eNB from $K_{eNB}$ as well as an identifier for the encryption algorithm.

FIG. 5B illustrates the dependencies between the different keys, and how the different keys can be derived from the network nodes point of view. FIG. 5C illustrates the dependencies between the different keys, and how the different keys can be derived by the UE. As FIGS. 5B and 5C show, the length of $K_{ASME}$ and $K_{eNB}$ can be 256 bits, and 256-bit NAS, UP and RRC keys can be derived from $K_{ASME}$ and $K_{eNB}$, respectively. In case the encryption or integrity algorithm used to protect NAS, UP or RRC requires a 128-bit key as input, the key can be truncated and the 128 least significant bits can be used. The function, t, can receive a 256-bit string input, and return the 128 least significant bits of that string as output. The input Ks, in the derivation of the KASME, can be employed for LTE Release 8 version, or earlier versions of Universal Subscriber Identity Modules (USIMs), the concatenation of CK and IK. CK and IK can be long-term keys shared between UE and HSS, where the K can be a permanent key stored on the USIM on a Universal Integrated Circuit Card (UICC) and in the Authentication Centre (AuC), and CK, IK can be the pair of keys derived in the AuC and on the USIM during an Authentication and Key Agreement (AKA) run. CK, IK can be handled differently depending on whether they are used in an Evolved Packet System (EPS) context or a legacy context, as described in section 6.1.2 of 3GPP TS 33.401 and/or 3GPP TS 33.102.

Figure 6:
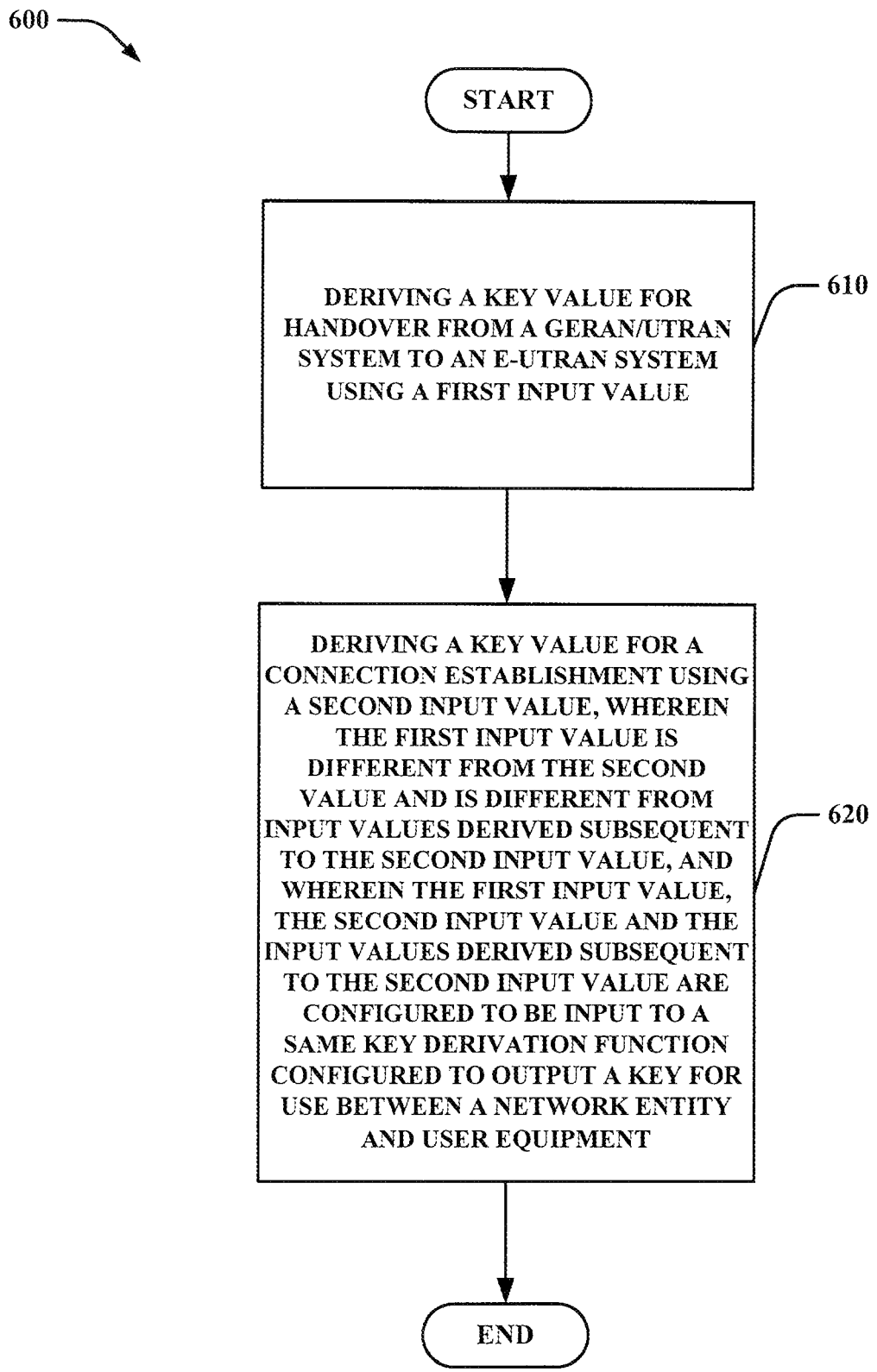
FIGS. 6 and 7 are illustrations of flowcharts of example methods for facilitating handover security in accordance with various aspects set forth herein.
Figure 7:
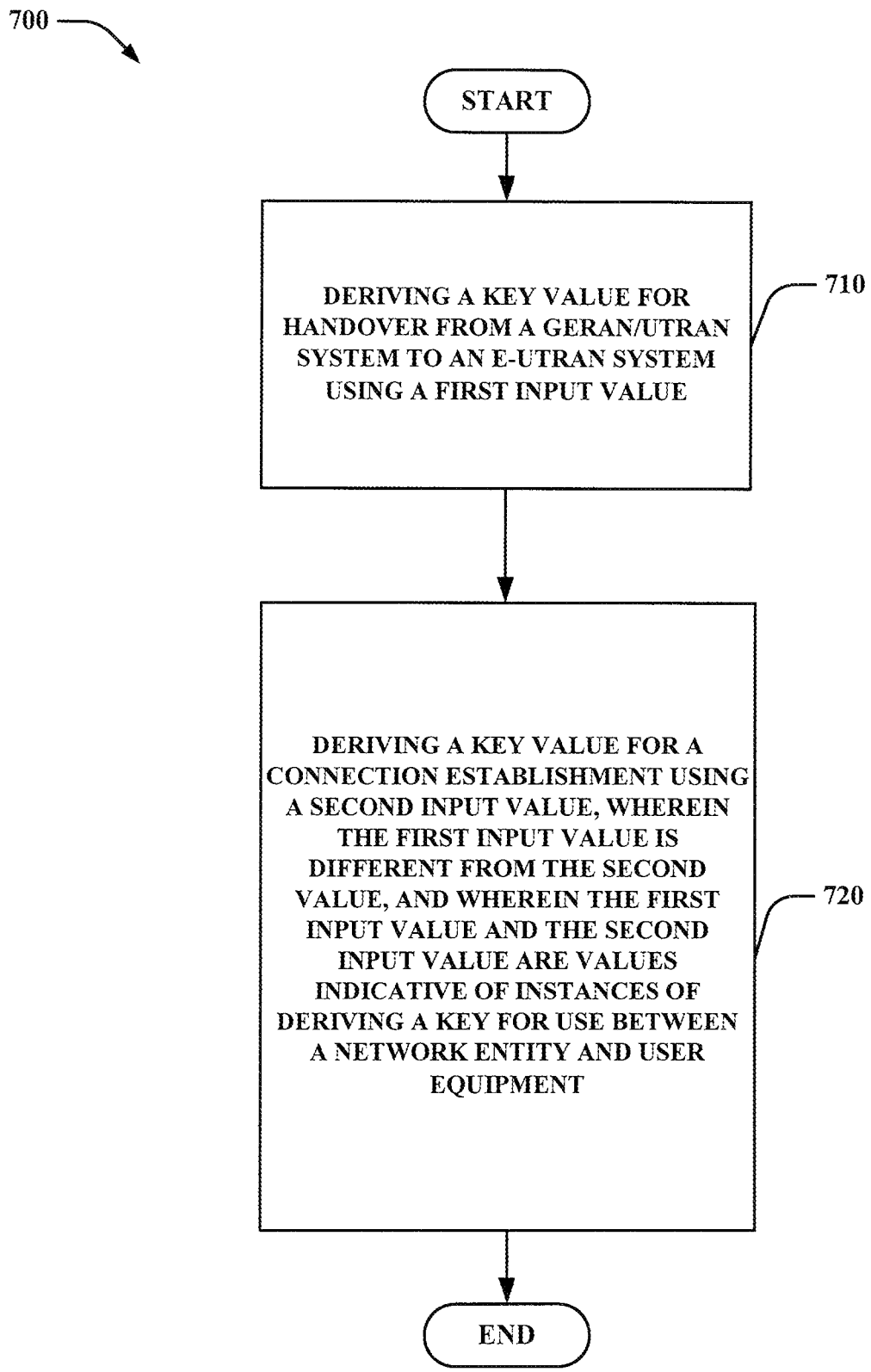

FIGS. 6 and 7 are illustrations of flowcharts of example methods for facilitating handover security in accordance with various aspects set forth herein. Referring first to FIG. 6, at 610, method 600 can include deriving a key value for handover using a first input value. The handover can be from a GERAN/UTRAN system to an E-UTRAN system. At 620, method 600 can include deriving a key value for a connection establishment using a second input value, wherein the first input value is different from the second input value and is different from input values derived subsequent to the second input value, and wherein the first input value, the second input value and the input values derived subsequent to the second input value are configured to be input to a same key derivation function configured to output a key for use between a network entity and UE. In some embodiments, the network entity is the BS.

In some embodiments, the computation of $K_{eNB}$ is performed according to the following equation: $K_{eNB}$=KDF ($K_{ASME}$, S), where S is an input string to the KDF along with key $K_{ASME}$. S can include FC (with an FC value of 0x11)|UL NAS COUNT (with a value of 0x00 0x00)|length of the UL NAS COUNT (with a value of 0x00 0x04). FC can be an octet used to distinguish between different instances of the same algorithm. The instances can be indicative of the different types of algorithms performed. For example, different FC values are used depending on the parameter being derived. The current FC values can be in the range 0x10-0x1F. $K_{ASME}$ is a 256-bit key derived by the UE and by the Access Security Management Entity (ASME) called MME. The UE goes to idle mode in the new cell, for example, after a call has ended. The KDF function is also applied when a cryptographically protected E-UTRAN radio bearer is established and when a key change on-the-fly is performed.

In various embodiments, the computation of $K_{eNB}$, one or more of the aspects of the derivation of NAS key and the foregoing methods for handover can be as described in more detail in above-referenced 3GPP TS 33.401 v8.4.0. For example, the MME and UE can derive the NAS keys from the mapped key $K'_{ASME}$ as specified in Annex A of 3GPP TS 33.401 v8.4.0. $K_{ASME}$ is a key derived by the UE and is transferred to the Access Security Management Entity (ASME).

In some embodiments, the derivation of NAS keys and $K_{eNB}$ during handover from UTRAN to E-UTRAN can be as follows. The MME and the UE can derive NAS keys from a mapped key, $K'_{ASME}$, as specified in Annex A. The MME and UE can derive the key, $K_{eNB}$, by applying the KDF defined in 3GPP TS 33.401 v8.4.0 Annex A.3 using the mapped key $K'_{ASME}$ and $2^{32}-1$ as the value of the UL NAS COUNT parameter. In some embodiments, the MME and UE only uses the $2^{32}-1$ as the value of the UL NAS COUNT for the purpose of deriving $K_{eNB}$ and do not actually set the UL NAS COUNT to $2^{32}-1$. The reason for choosing such a value not in the normal NAS COUNT range, e.g., [0, $2^{24}-1$] is to avoid any possibility that the value may be used to derive the same $K_{eNB}$ again.

In some embodiments, an UL NAS COUNT value other than zero (e.g., 0x00 0x00) can be used for $K_{eNB}$ derivation during handover procedures. By way of example, but not limitation, an UL NAS COUNT value can be the value for which all bits are set to 1 for the UL NAS COUNT (e.g., 0xFF 0xFF).

In various embodiments of Long-Term Evolution (LTE) systems, the UL NAS COUNT value begins at a value indicative of 0, and continues to increase over time. As such, in some embodiments, the UL NAS COUNT value used for $K_{eNB}$ derivation during handover procedures can be any value that the NAS COUNT values will never reach.

In some embodiments, the second input value is a value within a first range of possible values for the uplink non-access stratum count values, and the first input value is a value outside of the first range of possible values for the UL non-access stratum count values.

In some embodiments, the first input value to the KDF is different from the second input value to the KDF and is different from input values derived subsequent to the second input value. In some embodiments, the first input value, second input value and input values derived subsequent to the second input value are configured to be input to a same key derivation function configured to output a key for use between a network entity and a UE. The key value can be the value for $K_{eNB}$. The $K_{eNB}$ can be derived at the KDF of the MME and/or the UE. The UE can be in communication with a network entity, including, but not limited to, a BS or MME. The KDF can be provided in the UE handover module discussed with reference to FIG. 8A and/or the MME discussed throughout herein.

Referring back to FIG. 6, as such, instead of using the same inputs to the KDF for first input value and second input value (and input values derived subsequent to the second input value) for different processes (e.g., handover and other processes including, but not limited to, a NAS service request), and deriving a same value for $K_{eNB}$ (which can result in repeating a keystream for the different processes), in some embodiments, method 600 can be a method wherein the first input value to the KDF is different than the second input value to the KDF (and is different from the input values derived subsequent to the second input value). As such, two or more different values can be generated for $K_{eNB}$. The input values can be those indicative of NAS COUNT values, and/or values indicative of a number of instances of deriving the key value, $K_{eNB}$.

For example, in some embodiments, the first input value, the second input value (and input values derived subsequent to the second input value) are indicative of UL NAS COUNT values, and the first input value is a value other than zero (e.g., 0x00 0x00) during handover.

In some embodiments, with LTE systems, the NAS COUNT value starts at 0. As such, the UL NAS COUNT value for handover can be any value that the NAS COUNT value will never reach.

In some embodiments, the second input value is a value within a first range of possible values for the uplink non-access stratum count values, and the first input value is a value outside of the first range of possible values for the UL non-access stratum count values.

In this embodiment of setting the first input value to a value other than zero (e.g., 0x00 0x00) during handover, the first input value is indicative of setting each bit of the first input value to one. For example, all bits can be set to one for the UL NAS COUNT (e.g., 0xFF 0xFF).

In another embodiment, of setting the first input value to a value other than zero (e.g., 0x00 0x00) during handover.

In various embodiments of Long-Term Evolution (LTE) systems, the UL NAS COUNT value begins at a value indicative of 0, and continues to increase over time. As such, in some embodiments, the UL NAS COUNT value used for $K_{eNB}$ derivation during handover procedures can be any value that the NAS COUNT values will never reach.

The KDF computing the $K_{eNB}$ can be located at the user equipment. The KDF can also be located in the network. For example, the network can include an MME and a BS. The MME can derive the first input value, second input value and/or other input values derived subsequent to the second input value.

As another example of using inputs to the KDF that differ, in some embodiments, the first input value and the second input value are indicative of a number of instances of deriving the key value, $K_{eNB}$. In these embodiments, the first input value is a value other than 0x11 when deriving the $K_{eNB}$ for handover.

As another example of using inputs to the KDF that differ, in some embodiments, the first input value and the second input value are indicative of NAS COUNT values, and the first input value is a value of zero (for handover), and the second input value, and input values derived subsequent to the second input value, are other than zero (for non-handover processes). In this embodiment, the second input value is generated by initializing a NAS COUNT value to a value of one. In some embodiments, the second input value is generated by initializing an UL non-access stratum count value to one (for the case wherein handover of the UE is to an Evolved Universal Mobile Telecommunications Systems (UMTS) Terrestrial Radio Access Network).

Referring now to FIG. 7, at 710, method 700 can include deriving a key value for handover using a first input value. The handover can be from a GERAN/UTRAN system to an E-UTRAN system. At 720, method 700 can include deriving a key value for a connection establishment using a second input value, wherein the first input value is different from the second input value, and wherein the first input value and the second input value are values indicative of instances of deriving a key for use between a network entity and UE. In some embodiments, the first input value is a value other than 0x11.

Figure 8A:
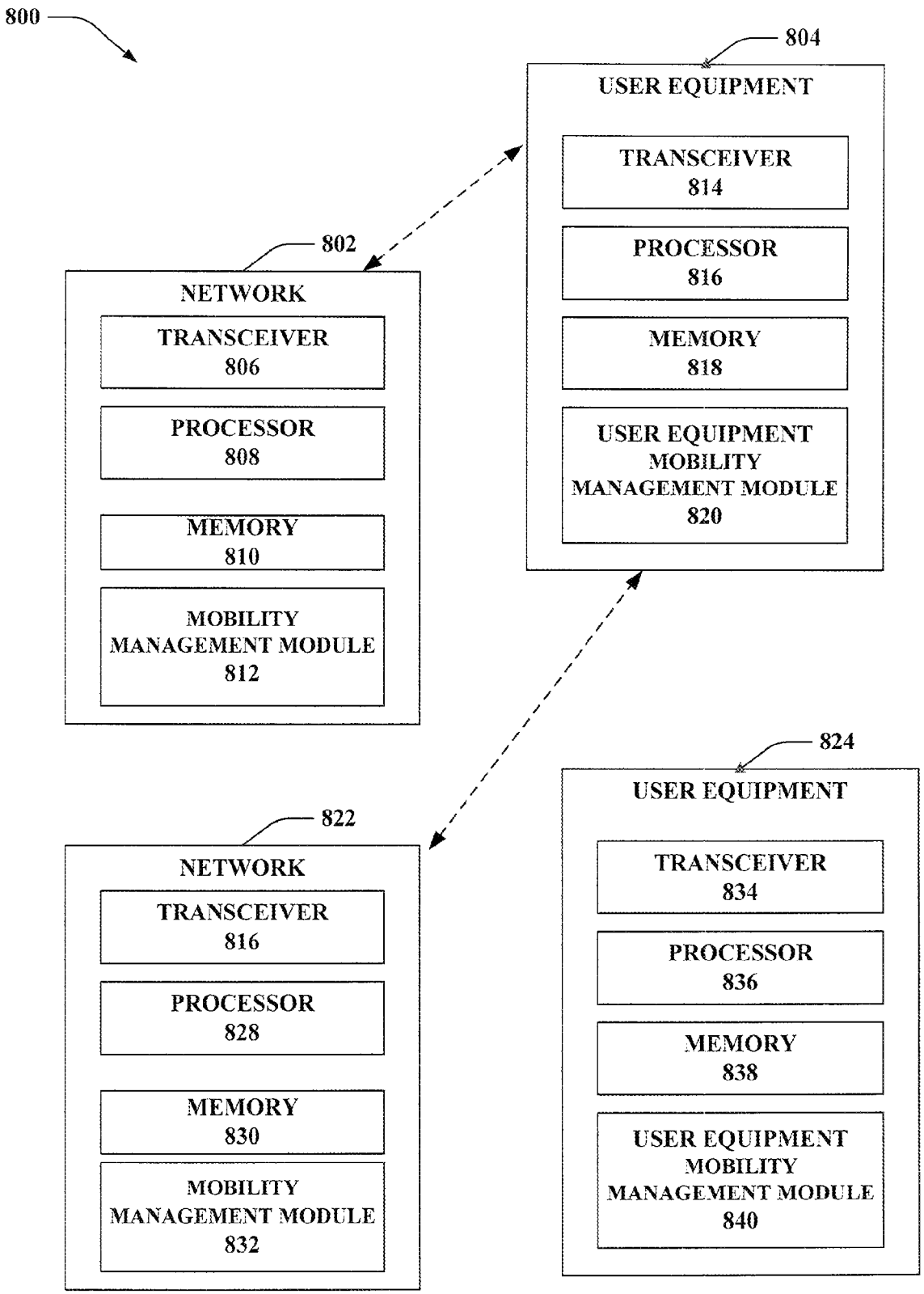
FIGS. 8A and 8B illustrate example block diagrams of a wireless communication system for facilitating key exchange in accordance with various aspects set forth herein.

FIG. 8A is an illustration of an example block diagram of a wireless communication system for facilitating key exchange in accordance with various aspects set forth herein. In some embodiments, the key exchange can be employed during handover of a UE from one network to another network. Referring to FIGS. 5, 6 and 7, methods for facilitating handover security can be provided, as described herein. Referring specifically to FIG. 8A, in the embodiments described, the networks 802, 822 can include transceivers 806, 816 configured to transmit and receive data and/or control information and/or any other type of information described herein with reference to any of the systems, methods, apparatus and/or computer program products to and from UEs 804, 824, respectively. For example, the transceivers 806, 816 can be configured to transmit information for performing handover and/or facilitating security with UEs 804, 824 during handover.

Networks 802, 822 can also include processors 808, 828 and memory 810, 830. Processors 808, 828 can be configured to perform one or more of the functions described herein with reference to any of the systems, methods, apparatus and/or computer program products. The networks 802, 822 can include memory 810, 830, respectively. The memory 810, 830 can be for storing computer-executable instructions and/or information for performing the functions described herein with reference to any of the systems, methods, apparatus and/or computer program products.

Networks 802, 822 can also include mobility management modules 812, 832 configured to perform methods to facilitate key exchange as described herein. In some embodiments, the mobility management modules 812, 832 can be MMEs, as described herein. In some embodiments, the networks 802, 822 are configured to perform one or more of the steps for facilitating handover security as described herein. In various embodiments, the networks 802, 822 can also include BSs (not shown) configured to facilitate handover to/from UEs 804, 824.

The UEs 804, 824 can include transceivers 814, 834 configured to transmit and receive data and/or control information and/or any other type of information described herein with reference to any of the systems, methods, apparatus and/or computer program products to and from BSs (not shown) and/or networks 802, 822, respectively. In some embodiments, the transceivers 814, 834 can be configured to receive and/or transmit information for performing handover and/or facilitating security with networks 802, 822 before, after and/or during handover. By way of example, but not limitation, the information can include, security protocol keys, key values, NAS COUNT values, values that are indicative of a number of instances of the derivation or generation of the KDF and the like. In some embodiments, the value indicative of a number of instances of the derivation or generation of the KDF can be an octet value indicated as FC.

UEs 804, 824 can also include processors 816, 836 and memory 818, 838. Processors 816, 836 can be configured to perform one or more of the functions described herein with reference to any of the systems, methods, apparatus and/or computer program products. The UEs 804, 824 can include memory 818, 838 respectively. The memory 818, 838 can be for storing computer-executable instructions and/or information for performing the functions described herein with reference to any of the systems, methods, apparatus and/or computer program products.

UEs 804, 824 can also include UE mobility management modules 820, 840 configured to perform methods to facilitate handover security as described herein. In some embodiments, the UE mobility management modules 820, 840 configured to perform methods to facilitate handover security as described 820, 840 are configured to perform one or more of the steps of methods 6 and/or 7. In some embodiments, the UE mobility management modules 820, 840 can include or be MMEs as described herein. In various embodiments, UEs 804, 824 can be or be included within systems 900 and/or 1000 discussed below.

Figure 8B:
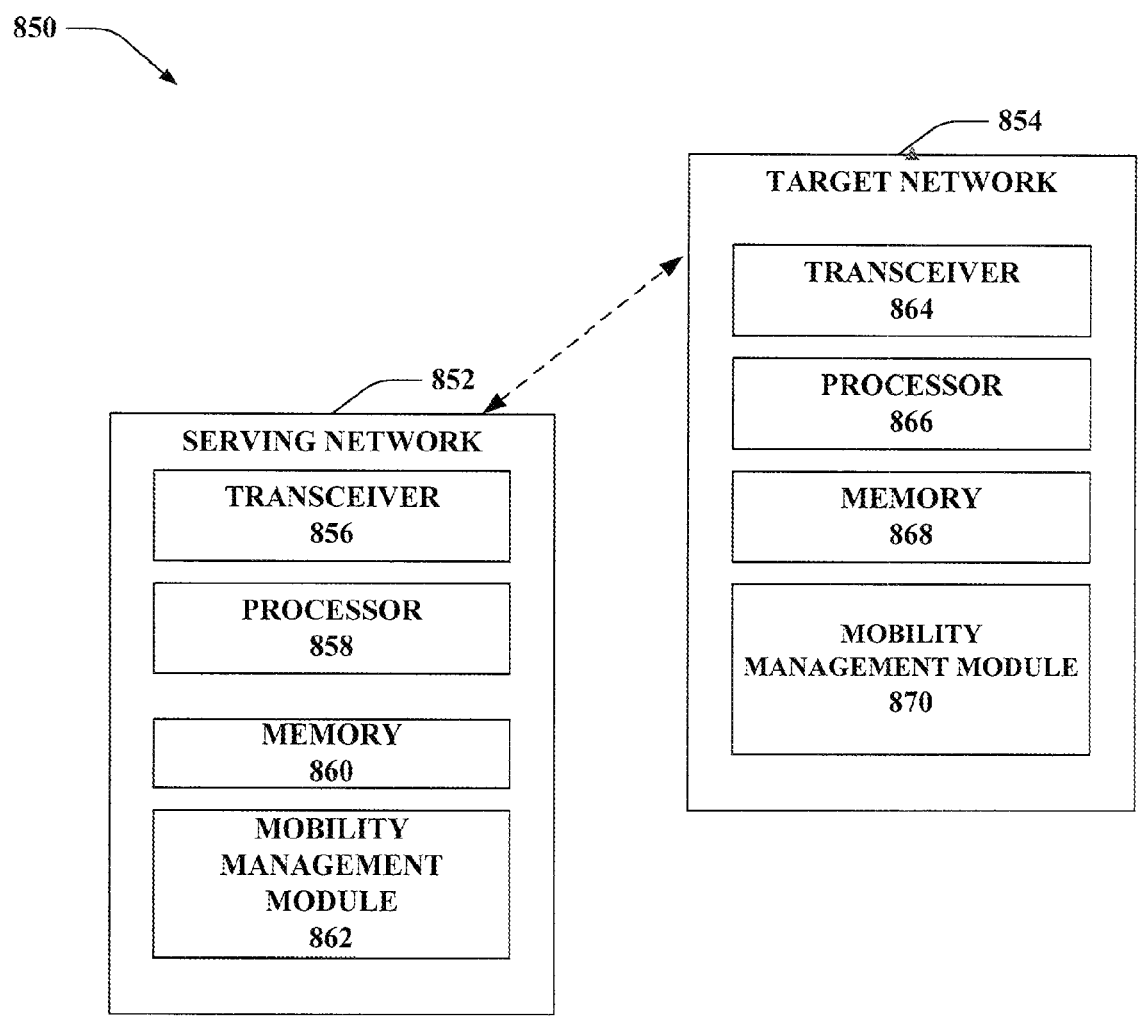

FIG. 8B is an illustration of an example block diagram of a wireless communication system for facilitating key exchange in accordance with various aspects set forth herein. In some embodiments, the key exchange can be employed during handover of a UE from one network to another network. Referring to FIGS. 5, 6 and 7, methods for facilitating handover security can be provided, as described herein. Referring specifically to FIG. 8B, in the embodiments described, the serving network 852 and target network 854 can include transceivers 856, 864 configured to transmit and receive data and/or control information and/or any other type of information described herein with reference to any of the systems, methods, apparatus and/or computer program products to and from networks 852, 854. For example, the transceivers 856, 864 can be configured to transmit information for performing handover and/or facilitating security with UEs during handover. With reference to FIG. 8A, the UEs can be UEs 804, 824. By way of example, but not limitation, the information can include, security protocol keys, key values, NAS COUNT values, FC values and the like, and the operations can include those described with reference to FIGS. 5, 6 and/or 7.

The serving network 852 and target network 854 can also include processors 858, 866 and memory 860, 868. Processors 858, 866 can be configured to perform one or more of the functions described herein with reference to any of the systems, methods, apparatus and/or computer program products. The serving network 852 and target network 854 can include memory 860, 868, respectively. The memory 860, 868 can be for storing computer-executable instructions and/or information for performing the functions described herein with reference to any of the systems, methods, apparatus and/or computer program products.

The serving network 852 and target network 854 can also include mobility management modules 862, 870 configured to perform methods to facilitate key exchange, handover security, etc. as described herein. In some embodiments, the mobility management modules 862, 870 can be or include MMEs as described herein. In some embodiments, the serving network 852 and target network 854 are configured to perform one or more of the steps for enabling methods 6 and/or 7. In various embodiments, the serving network 852 and target network 854 and/or mobility management modules 862, 870 can be or be included within systems 900 and/or 1000 discussed below.

Figure 9:
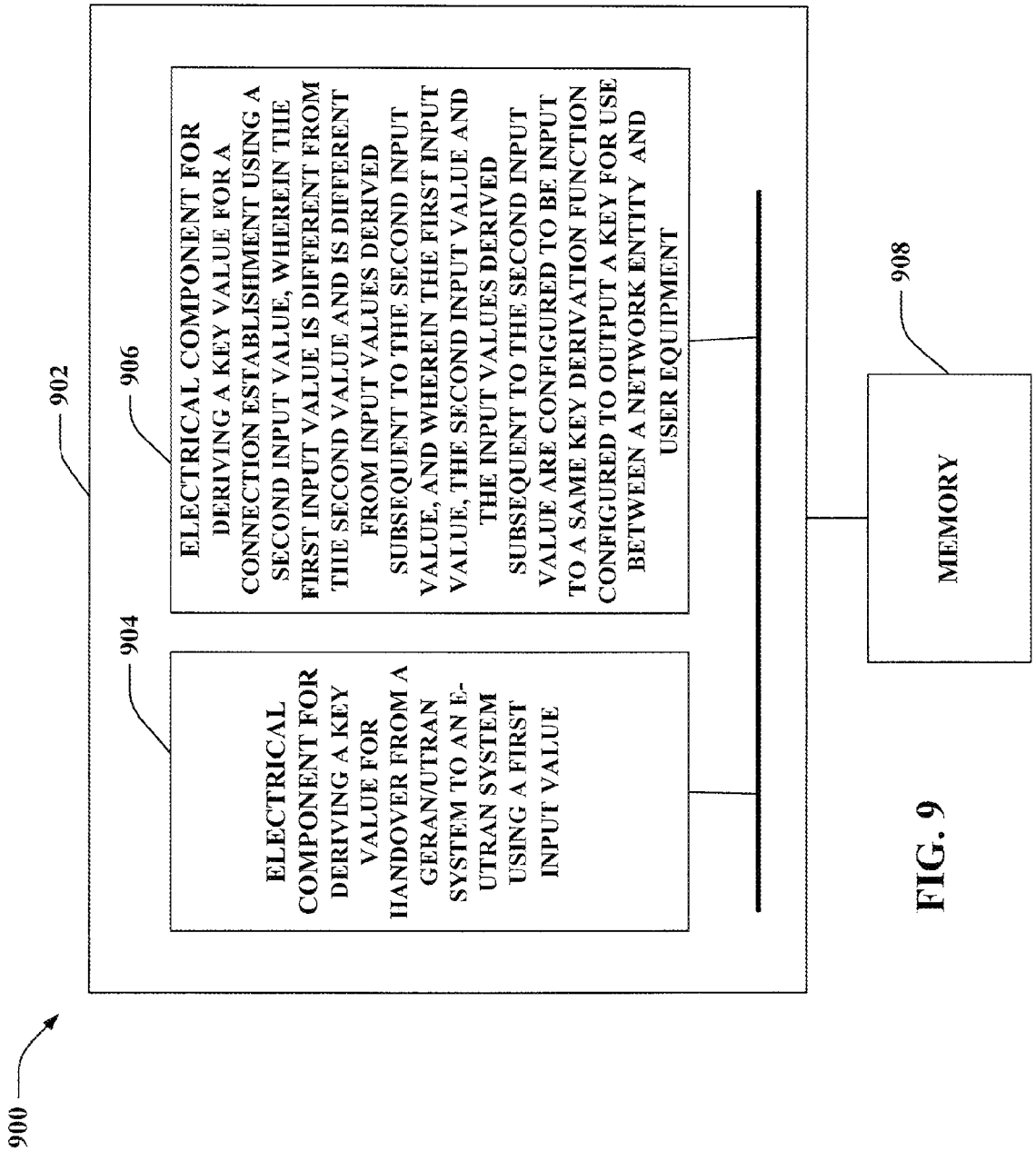
FIGS. 9 and 10 are illustrations of block diagrams of example systems for facilitating handover security in accordance with various aspects set forth herein.
Figure 10:
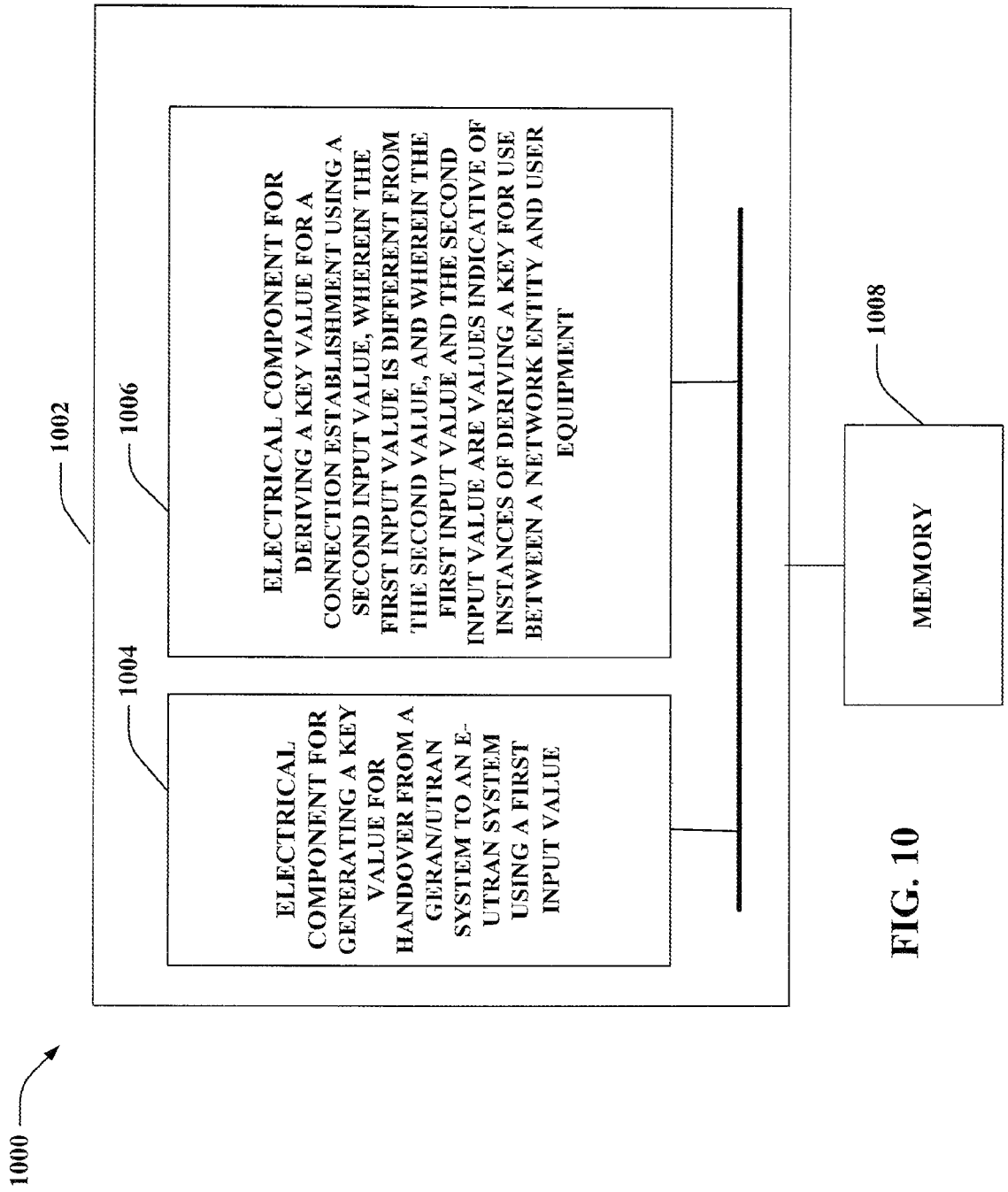

FIGS. 9 and 10 are illustrations of block diagrams of example systems for facilitating handover security in accordance with various aspects set forth herein. It is to be appreciated that system 900 is represented as including functional blocks, which can be functional blocks that represent functions implemented by a processor, hardware, software, firmware, or combination thereof. System 900 can include a logical or physical grouping 902 of electrical components for facilitating the handover security.

The electrical components can act in conjunction. For instance, the logical or physical grouping 902 can include an electrical component 904 for deriving a key value for handover using a first input value. The logical or physical grouping 902 can also include an electrical component 906 for deriving a key value for a connection establishment using a second input value, wherein the first input value is different from the second input value and is different from input values derived subsequent to the second input value, and wherein the first input value, the second input value and the input values derived subsequent to the second input value are configured to be input to a same key derivation function configured to output a key for use between a network entity and UE. In some embodiments, the network entity can be an BS.

In some embodiments, the first input value is different from the second input value (and is different from input values derived subsequent to the second input value). In some embodiments, the first input value, the second input value (and input values derived subsequent to the second input value) are configured to be input to a same key derivation function configured to output a key for use between a network entity and a UE. In some embodiments, the network entity is a BS. The key value can be the value for $K_{eNB}$. The $K_{eNB}$ can be derived at the KDF of the MME. The KDF can be provided in the UE handover module discussed with reference to FIG. 8A and/or the MME discussed throughout herein.

Referring back to FIG. 9, as such, instead of using the same inputs to the KDF for first input value and second input value for different processes (e.g., handover and other processes including, but not limited to, a NAS service request), and deriving a same value for $K_{eNB}$ (which can result in repeating a keystream for the different processes), in some embodiments, system 900 can be a system wherein the first input value to the KDF is different than the second input value to the KDF (and different from other input values derived subsequent to the second input value). As such, two different values can be generated for $K_{eNB}$. The input values can be those indicative of NAS COUNT values, and/or values indicative of a number of instances of deriving the key value, $K_{eNB}$.

For example, in some embodiments, the first input value, the second input value (and input values derived subsequent to the second input value) are indicative of UL NAS COUNT values, and the first input value is a value other than zero (e.g., 0x00 0x00) during handover.

In various embodiments of Long-Term Evolution (LTE) systems, the UL NAS COUNT value begins at a value indicative of 0, and continues to increase over time. As such, in some embodiments, the UL NAS COUNT value used for K_eNB derivation during handover procedures can be any value that the NAS COUNT values will never reach.

In some embodiments, the second input value is a value within a first range of possible values for the uplink non-access stratum count values, and the first input value is a value outside of the first range of possible values for the UL non-access stratum count values.

In this embodiment of setting the first input value to a value other than zero (e.g., 0x00 0x00) during handover, the first input value is indicative of setting each bit of the first input value to one. For example, all bits can be set to one for the UL NAS COUNT (e.g., 0xFF 0xFF).

In another embodiment, of setting the first input value to a value other than zero (e.g., 0x00 0x00) during handover.

The KDF computing the $K_{eNB}$ can be located at the user equipment. The KDF can also be located in the network. For example, the network can include an MME and BS.

As another example of using inputs to the KDF that differ, in some embodiments, the first input value and the second input value are indicative of a number of instances of deriving the key value, $K_{eNB}$. In these embodiments, the first input value is a value other than 0x11 when deriving the $K_{eNB}$ for handover.

As another example of using inputs to the KDF that differ, in some embodiments, the first input value and the second input value are indicative of NAS COUNT values, and the first input value is a value of zero (for handover), and the second input value, and input values derived subsequent to the second input value, are other than zero (for non-handover processes). In this embodiment, the second input value is generated by initializing a NAS COUNT value to a value of one. In some embodiments, the second input value is generated by initializing an UL non-access stratum count value to one (for the case wherein handover of the UE is to an Evolved Universal Mobile Telecommunications Systems (UMTS) Terrestrial Radio Access Network).

Referring now to FIG. 10, the logical or physical grouping 1002 can include an electrical component 1004 for deriving a key value for handover using a first input value. The logical or physical grouping 1002 can include an electrical component 1006 for deriving a key value for a connection establishment using a second input value, wherein the first input value is different from the second input value, and wherein the first input value and the second input value are values indicative of instances of deriving a key for use between a network entity and UE. In some embodiments, the first input value is a value other than 0x11.

A wireless multiple-access communication system can simultaneously support communication for multiple wireless access terminals. As mentioned above, each terminal can communicate with one or more BSs via transmissions on the forward and reverse links. The forward link (or downlink) refers to the communication link from the BSs to the terminals, and the reverse link (or uplink) refers to the communication link from the terminals to the BSs. This communication link can be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas can be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system can support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 11:
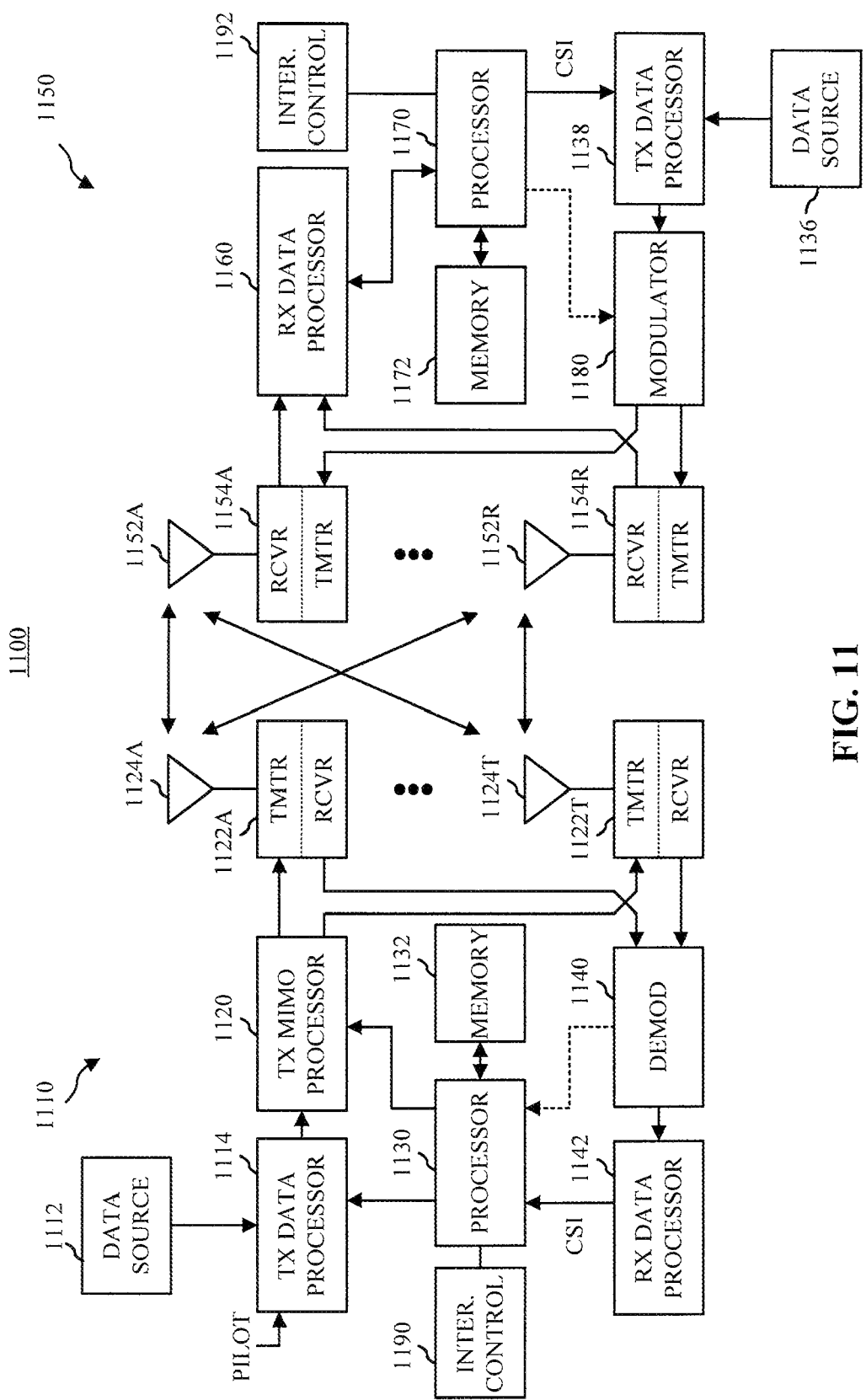
FIG. 11 is an illustration of an example wireless communication system in which the embodiments described herein can be employed in accordance with various aspects set forth herein.

FIG. 11 shows an example wireless communication system in which the embodiments described herein can be employed in accordance with various aspects set forth herein. The teachings herein may be incorporated into a node (e.g., a device) employing various components for communicating with at least one other node. FIG. 11 depicts several sample components that may be employed to facilitate communication between nodes. Specifically, FIG. 11 illustrates a wireless device 1110 (e.g., an access point) and a wireless device 1150 (e.g., an access terminal) of a wireless communication system 1100 (e.g., MIMO system). At the device 1110, traffic data for a number of data streams is provided from a data source 1112 to a transmit (TX) data processor 1114.

In some aspects, each data stream is transmitted over a respective transmit antenna. The TX data processor 1114 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1130. A data memory 1132 may store program code, data, and other information used by the processor 1130 or other components of the device 1110.

The modulation symbols for all data streams are then provided to a TX MIMO processor 1120, which may further process the modulation symbols (e.g., for OFDM). The TX MIMO processor 1120 then provides $N_T$ modulation symbol streams to $N_T$ transceivers (XCVR) 1122A through 1122T. In some aspects, the TX MIMO processor 1120 applies beam-forming weights to the symbols of the data streams and to the antenna from which the symbol is being transmitted.

Each transceiver 1122 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1122A through 1122T are then transmitted from $N_T$ antennas 1124A through 1124T, respectively.

At the device 1150, the transmitted modulated signals are received by $N_R$ antennas 1152A through 1152R and the received signal from each antenna 1152 is provided to a respective transceiver (XCVR) 1154A through 1154R. Each transceiver 1154 conditions (e.g., filters, amplifies, and downconverts) a respective received signal, digitizes the conditioned signal to provide samples, and further processes the samples to provide a corresponding "received" symbol stream.

A receive (RX) data processor 1160 then receives and processes the $N_R$ received symbol streams from $N_R$ transceivers 1154 based on a particular receiver processing technique to provide $N_T$ "detected" symbol streams. The RX data processor 1160 then demodulates, deinterleaves, and decodes each detected symbol stream to recover the traffic data for the data stream. The processing by the RX data processor 1160 is complementary to that performed by the TX MIMO processor 1120 and the TX data processor 1114 at the device 1110.

A processor 1170 periodically determines which pre-coding matrix to use (discussed below). The processor 1170 formulates a reverse link message comprising a matrix index portion and a rank value portion. A data memory 1172 may store program code, data, and other information used by the processor 1170 or other components of the device 1150.

The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by the transceivers 1154A through 1154R, and transmitted back to the device 1110.

At the device 1110, the modulated signals from the device 1150 are received by the antennas 1124, conditioned by the transceivers 1122, demodulated by a demodulator (DEMOD) 1140, and processed by a RX data processor 1142 to extract the reverse link message transmitted by the device 1150. The processor 1130 then determines which pre-coding matrix to use for determining the beam-forming weights then processes the extracted message.

FIG. 11 also illustrates that the communication components may include one or more components that perform interference control operations as taught herein. For example, an interference (INTER.) control component 1190 may cooperate with the processor 1130 and/or other components of the device 1110 to send/receive signals to/from another device (e.g., device 1150) as taught herein. Similarly, an interference control component 1192 may cooperate with the processor 1170 and/or other components of the device 1150 to send/receive signals to/from another device (e.g., device 1110). It should be appreciated that for each device 1110 and 1150 the functionality of two or more of the described components may be provided by a single component. For example, a single processing component may provide the functionality of the interference control component 1190 and the processor 1130 and a single processing component may provide the functionality of the interference control component 1192 and the processor 1170.

In an aspect, logical channels can be classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can include a Multicast Control Channel (MCCH), which is a Point-to-multipoint DL channel used for transmitting Multimedia Broadcast and Multicast Service (MBMS) scheduling and control information for one or several Multicast Traffic Channels (MTCHs). Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include an MTCH for Point-to-multipoint DL channel for transmitting traffic data.

In an aspect, Transport Channels are classified into DL and UL. DL Transport Channels can include a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE) by being broadcasted over an entire cell and being mapped to Physical layer (PHY) resources that can be used for other control/traffic channels. The UL Transport Channels can comprise a Random Access Channel (RACH), a Request Channel (REQCH), an Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors and/or other electronic units designed to perform the functions described herein, or a combination thereof.

When the embodiments are implemented in software, firmware, middleware or microcode, program code or code segments, they can be stored in a machine-readable medium (or a computer-readable medium), such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method to facilitate handover security, the method comprising:

deriving a key value using a key derivation function (KDF) for handover from a Global System for Mobile Communications Enhanced Data rates for GSM Evolution Radio Access Network/Universal Terrestrial Radio Access Network ("GERAN/UTRAN") to an Evolved Universal Terrestrial Radio Access Network ("E-UTRAN") system using a first input value;

performing the handover using the key value derived using the first input value; and deriving a key value using the KDF for a connection establishment using a second input value, wherein the first input value is different from the second input value and is different from input values derived subsequent to the second input value, and establishing the connection using the key value derived using the second input value;

wherein the first input value, the second input value and the input values derived subsequent to the second input value are input to a same key derivation function that outputs a key for use between a network entity and user equipment during the handover and connection establishment; and wherein the first input value and the second input value are indicative of uplink non-access stratum count values, the second input value and the input values derived subsequent to the second input value are values within a range of $[0,2^{24}]$, and the first input value is a value outside of the range of $[0,2^{24}]$.

2. The method of claim 1, wherein the first input value is used only as the value of an uplink non-access stratum count value for the purpose of deriving a key value for handover and is not used to actually set the uplink non-access stratum count.

3. The method of claim 1, wherein the first input value is indicative of setting each bit of the first input value to one.

4. The method of claim 1, wherein deriving the key value is performed at the user equipment.

5. The method of claim 1, wherein deriving the key value is performed at a network comprising a mobility management entity and a base station, and wherein the mobility management entity performs deriving the key value and outputs a derived key value to the base station.

6. The method of claim 1, wherein the connection establishment includes a non-access stratum service request.

7. The method of claim 1, wherein the second input value is generated by initializing a non-access stratum count value to a value of one.

8. The method of claim 1, wherein the second input value is generated by initializing an uplink non-access stratum count value to one based, at least, on the handover being from a GERAN/UTRAN system to an E-UTRAN system.

9. A computer program product, comprising:
a non-transitory computer-readable medium, comprising:
a first set of codes for causing a computer to derive a key value using a key derivation function (KDF) for handover from a Global System for Mobile Communications Enhanced Data rates for GSM Evolution Radio Access Network/Universal Terrestrial Radio Access Network ("GERAN/UTRAN") to an Evolved Universal Terrestrial Radio Access Network ("E-UTRAN") system using a first input value;
a second set of codes for causing the computer to derive a key value using the KDF for a connection establishment using a second input value, wherein the first input value is different from the second input value and is different from input values derived subsequent to the second input value, and establishing the connection using the key value derived using the second input value;
a third set of codes for performing the handover using the key value derived using the first input value; and
wherein the first input value, the second input value and the input values derived subsequent to the second input value are input to a same key derivation function that outputs a key for use between a network entity and user equipment during the handover and connection establishment; and
wherein the first input value and the second input value are indicative of uplink non-access stratum count values, the second input value and the input values derived subsequent to the second input value are values within a range of $[0,2^{24}]$, and the first input value is a value outside of the range of $[0,2^{24}]$.

10. The computer program product of claim 9, wherein the first input value is used only as the value of an uplink non-access stratum count value for the purpose of deriving a key value for handover and is not used to actually set the uplink non-access stratum count.

11. The computer program product of claim 9, wherein the first input value is indicative of setting each bit of the first input value to one.

12. The computer program product of claim 9, wherein deriving the key value is performed at the user equipment.

13. The computer program product of claim 9, wherein deriving the key value is performed at a network comprising a mobility management entity and a base station, and wherein the mobility management entity performs deriving the key value and outputs a derived key value to the base station.

14. The computer program product of claim 9, wherein the connection establishment includes a non-access stratum service request.

15. The computer program product of claim 9, wherein the second input value is generated by initializing a non-access stratum count value to a value of one.

16. The computer program product of claim 9, wherein the second input value is generated by initializing an uplink non-access stratum count value to one based, at least, on the handover being from a GERAN/UTRAN system to an E-UTRAN system.

17. An apparatus, comprising:
means for deriving a key value using a key derivation function (KDF) for handover from a Global System for Mobile Communications Enhanced Data rates for GSM Evolution Radio Access Network/Universal Terrestrial Radio Access Network ("GERAN/UTRAN") to an Evolved Universal Terrestrial Radio Access Network ("E-UTRAN") system using a first input value;
means for performing the handover using the key value derived using the first input value; and
means for deriving a key value using the KDF for a connection establishment using a second input value, wherein the first input value is different from the second input value and is different from input values derived subsequent to the second input value, and establishing the connection using the key value derived using the second input value;
wherein the first input value, the second input value and the input values derived subsequent to the second input value input to a same key derivation function that outputs a key for use between a network entity and user equipment during the handover and connection establishment; and
wherein the first input value and the second input value are indicative of uplink non-access stratum count values, the second input value and the input values derived subsequent to the second input value are values within a range of $[0,2^{24}]$, and the first input value is a value outside of the range of $[0,2^{24}]$.

18. The apparatus of claim 17, wherein the first input value is used only as the value of an uplink non-access stratum count value for the purpose of deriving a key value for handover and is not used to actually set the uplink non-access stratum count.

19. The apparatus of claim 17, wherein the first input value is indicative of setting each bit of the first input value to one.

20. The apparatus of claim 17, wherein deriving the key value is performed at the user equipment.

21. The apparatus of claim 17, wherein deriving the key value is performed at a network comprising a mobility management entity and a base station, and wherein the mobility management entity performs deriving the key value and outputs a derived key value to the base station.

22. The apparatus of claim 17, wherein the connection establishment includes a non-access stratum service request.

23. The apparatus of claim 17, wherein the second input value is generated by initializing a non-access stratum count value to a value of one.

24. The apparatus of claim 17, wherein the second input value is generated by initializing an uplink non-access stratum count value to one based, at least, on the handover being from a GERAN/UTRAN system to an E-UTRAN system.

25. An apparatus, comprising:
a mobility management module configured to:
derive a key value using a key derivation function (KDF) for handover from a Global System for Mobile Communications Enhanced Data rates for GSM Evolution Radio Access Network/Universal Terrestrial Radio Access Network ("GERAN/UTRAN") to an Evolved Universal Terrestrial Radio Access Network ("E-UTRAN") system using a first input value;
perform the handover using the key value derived using the first input value; and
derive a key value using the KDF for a connection establishment using a second input value, wherein the first input value is different from the second input value and is different from input values derived subsequent to the second input value, and establishing the connection using the key value derived using the second input value;
wherein the first input value, the second input value and the input values derived subsequent to the second input value input to a same key derivation function that outputs a key for use between a network entity and user equipment during the handover and connection establishment; and
wherein the first input value and the second input value are indicative of uplink non-access stratum count values, the second input value and the input values derived subsequent to the second input value are values within a range of $[0,2^{24}]$, and the first input value is a value outside of the range of $[0,2^{24}]$.

26. The apparatus of claim 25, wherein the first input value is used only as the value of an uplink non-access stratum count value for the purpose of deriving a key value for handover and is not used to actually set the uplink non-access stratum count.

27. The apparatus of claim 25, wherein the first input value is indicative of setting each bit of the first input value to one.

28. The apparatus of claim 25, wherein the mobility management module is a user equipment mobility management module and deriving the key value is performed at the user equipment.

29. The apparatus of claim 25, wherein the mobility management module is a mobility management entity and wherein the mobility management entity is configured to perform deriving the key value and to output a derived key value to a base station.

30. The apparatus of claim 25, wherein the connection establishment includes a non-access stratum service request.

31. The apparatus of claim 25, wherein the second input value is generated by initializing a non-access stratum count value to a value of one.

32. The apparatus of claim 25, wherein the second input value is generated by initializing an uplink non-access stratum count value to one based, at least, on the handover being from a GERAN/UTRAN system to an E-UTRAN system.

33. A method to facilitate handover security, the method comprising:

deriving a key value using a key derivation function (KDF) for handover from a Global System for Mobile Communications Enhanced Data rates for GSM Evolution Radio Access Network/Universal Terrestrial Radio Access Network ("GERAN/UTRAN") to an Evolved Universal Terrestrial Radio Access Network ("E-UTRAN") system using a first input value;
performing the handover using the key value derived using the first input value; and
deriving a key value using the KDF for a connection establishment using a second input value, wherein the first input value is different from the second input value, and wherein the first input value and the second input value are values indicative of instances of deriving a key for use between a network entity and user equipment, and establishing the connection using the key value derived using the second input value; and
wherein the first input value and the second input value are indicative of uplink non-access stratum count values, the second input value and the input values derived subsequent to the second input value are values within a range of $[0,2^{24}]$, and the first input value is a value outside of the range of $[0,2^{24}]$.

34. The method of claim 33, wherein the first input value is a value other than 0x11.

35. A computer program product, comprising:
a non-transitory computer-readable medium, comprising:
a first set of codes for causing a computer to derive a key value using a key derivation function (KDF) for handover from a Global System for Mobile Communications Enhanced Data rates for GSM Evolution Radio Access Network/Universal Terrestrial Radio Access Network ("GERAN/UTRAN") to an Evolved Universal Terrestrial Radio Access Network ("E-UTRAN") system using a first input value;
a second set of codes for causing the computer to derive a key value using the KDF for a connection establishment using a second input value, wherein the first input value is different from the second input value, and wherein the first input value and the second input value are values indicative of instances of deriving a key for use between a network entity and user equipment, and establishing the connection using the key value derived using the second input value;
a third set of codes for performing the handover using the key value derived using the first input value; and
wherein the first input value and the second input value are indicative of uplink non-access stratum count values, the second input value and the input values derived subsequent to the second input value are values within a range of $[0,2^{24}]$, and the first input value is a value outside of the range of $[0,2^{24}]$.

36. The computer program product of claim 35, wherein the first input value is a value other than 0x11.

37. An apparatus, comprising:
means for deriving a key value using a key derivation function (KDF) for handover from a Global System for Mobile Communications Enhanced Data rates for GSM Evolution Radio Access Network/Universal Terrestrial Radio Access Network ("GERAN/UTRAN") to an Evolved Universal Terrestrial Radio Access Network ("E-UTRAN") system using a first input value;
means for performing the handover using the key value derived using the first input value; and
means for deriving a key value using the KDF for a connection establishment using a second input value, wherein the first input value is different from the second input value, and wherein the first input value and the second input value are values indicative of instances of deriving a key for use between a network entity and user equipment, and establishing the connection using the key value derived using the second input value;

wherein the first input value and the second input value are indicative of uplink non-access stratum count values, the second input value and the input values derived subsequent to the second input value are values within a range of $[0,2^{24}]$, and the first input value is a value outside of the range of $[0,2^{24}]$.

38. The apparatus of claim 37, wherein the first input value is a value other than 0x11.

39. An apparatus, comprising:
a mobility management module configured to:
derive a key value using a key derivation function (KDF) for handover from a Global System for Mobile Communications Enhanced Data rates for GSM Evolution Radio Access Network/Universal Terrestrial Radio Access Network ("GERAN/UTRAN") to an Evolved Universal Terrestrial Radio Access Network ("E-UTRAN") system using a first input value;

perform the handover using the key value derived using the first input value; and
derive a key value for a connection establishment using a second input value,
wherein the first input value is different from the second input value, and wherein the first input value and the second input value are values indicative of instances of deriving a key for use between a network entity and user equipment, and establishing the connection using the key value derived using the second input value; and
wherein the first input value and the second input value are indicative of uplink non-access stratum count values, the second input value and the input values derived subsequent to the second input value are values within a range of $[0,2^{24}]$, and the first input value is a value outside of the range of $[0,2^{24}]$.

40. The apparatus of claim 39, wherein the first input value is a value other than 0x11.

* * * * *